(12) United States Patent
Worsley et al.

(10) Patent No.: US 9,868,596 B2
(45) Date of Patent: Jan. 16, 2018

(54) AUTOMATED LOADING SYSTEM

(71) Applicant: Amazon Technologies, Inc., Seattle, WA (US)

(72) Inventors: Timothy Craig Worsley, Snoqualmie, WA (US); Karl Eric Schrader, Snohomish, WA (US); Michael Ellsworth Bundy, Seattle, WA (US); Charles Edward Rice, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 14/502,927

(22) Filed: Sep. 30, 2014

(65) Prior Publication Data

US 2016/0090248 A1    Mar. 31, 2016

(51) Int. Cl.
| | | |
|---|---|---|
| *B65G 67/20* | (2006.01) | |
| *B65G 67/08* | (2006.01) | |
| *B65G 61/00* | (2006.01) | |
| *B65G 1/04* | (2006.01) | |

(52) U.S. Cl.
CPC ............ *B65G 67/08* (2013.01); *B65G 1/04* (2013.01); *B65G 61/00* (2013.01)

(58) Field of Classification Search
CPC ............................... B65G 67/20; B65G 67/08
USPC .......................................................... 414/809
See application file for complete search history.

(56) References Cited

U.S. PATENT DOCUMENTS

| | | | | |
|---|---|---|---|---|
| 5,009,560 A | * | 4/1991 | Ruder | B65G 67/08 198/588 |
| 5,325,953 A | * | 7/1994 | Doster | B65G 43/08 198/304 |
| 5,585,707 A | | 12/1996 | Thompson et al. | |
| 5,716,184 A | * | 2/1998 | Lowe | B65G 67/08 414/398 |
| 5,902,089 A | * | 5/1999 | Sinn | A01K 45/005 198/313 |
| 6,345,724 B1 | * | 2/2002 | Masumoto | B66C 11/20 212/173 |

(Continued)

FOREIGN PATENT DOCUMENTS

| | | |
|---|---|---|
| DE | 102010015530 | 10/2010 |
| FR | 2647763 A | 12/1990 |

OTHER PUBLICATIONS

International Search Report and Written Opinion of PCT Application No. PCT/US2015/052942 dated Jan. 7, 2016.

*Primary Examiner* — Jonathan Snelting
(74) *Attorney, Agent, or Firm* — Athorus, PLLC

(57) ABSTRACT

Cable robots may be used to automatically load items onto one or more surfaces in any environment. An item may be received on a carrier that is connected to tensioning actuators of a cable robot by one or more cables in tension. The actuators of the robot may be manipulated in concert to move the carrier from a first position to a second position, which may be fixed or in motion, at which the item may be expelled from the carrier. The carrier may include induction wheels and/or conveyors for receiving the item thereon and for expelling the item therefrom. The cable robot may be provided in series with a conveyor and mounted to a frame, and used to load items onto a delivery vehicle, such that the frame may be withdrawn as items are loaded.

16 Claims, 13 Drawing Sheets

(56) References Cited

U.S. PATENT DOCUMENTS

| | | | | |
|---|---|---|---|---|
| 7,267,240 | B2* | 9/2007 | Maurer | B66C 13/063 |
| | | | | 212/270 |
| 7,753,642 | B2* | 7/2010 | Bosscher | B25J 17/0266 |
| | | | | 414/735 |
| 8,562,277 | B2* | 10/2013 | Criswell | B65G 67/08 |
| | | | | 414/398 |
| 9,038,828 | B2* | 5/2015 | Enenkel | B65G 67/08 |
| | | | | 209/629 |
| 2008/0181753 | A1 | 7/2008 | Bastian et al. | |
| 2009/0066100 | A1 | 3/2009 | Bosscher et al. | |
| 2009/0067953 | A1* | 3/2009 | Schenning | B65G 47/914 |
| | | | | 414/140.3 |

\* cited by examiner

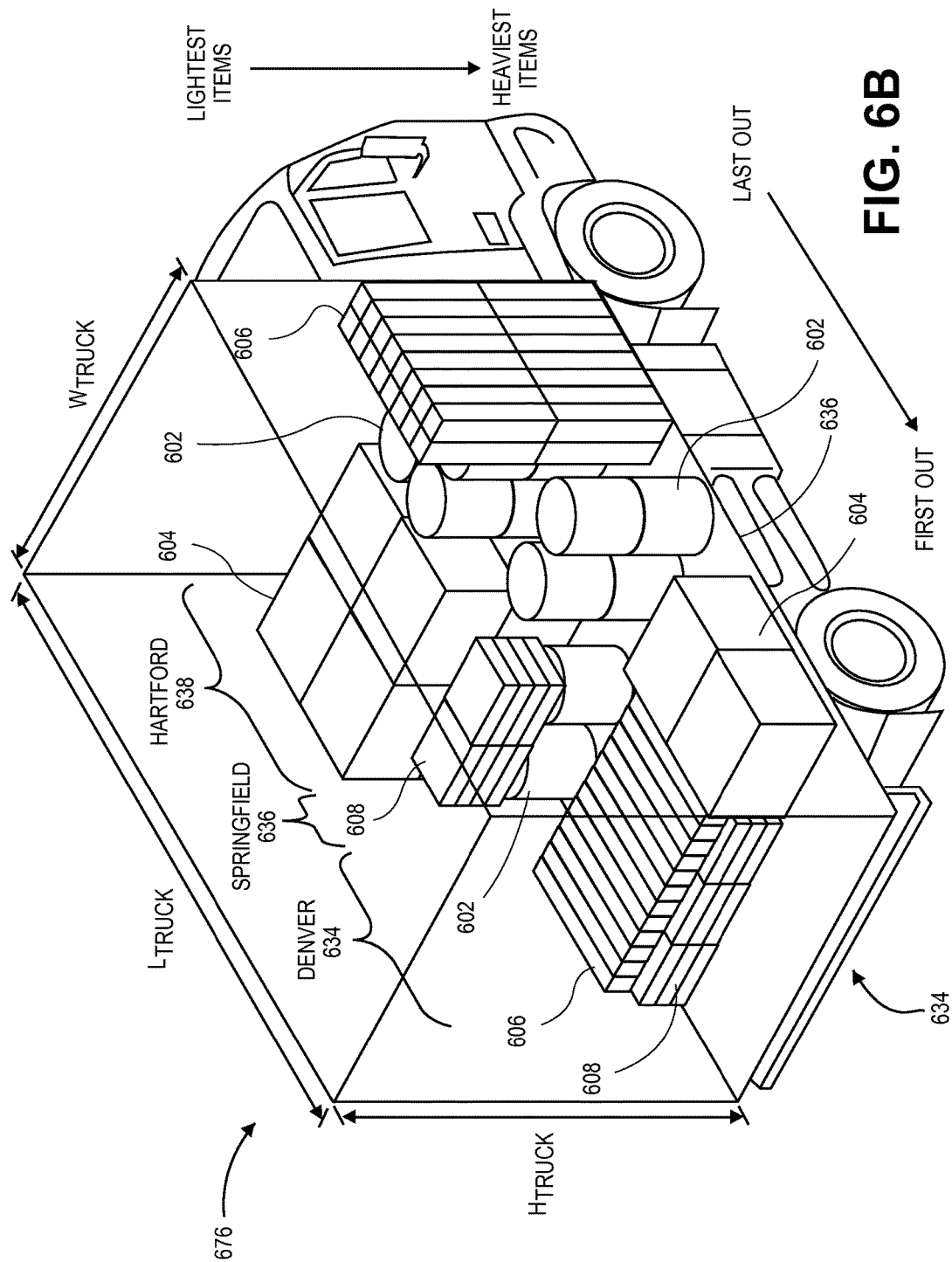

AUTOMATED LOADING SYSTEM

BACKGROUND

When a customer places an order to purchase one or more items from an online marketplace, the order may be assigned to a fulfillment center or other like facility where the items are housed or otherwise maintained, to a fulfillment center where the items have recently arrived, or to a fulfillment center where the items are expected to arrive within a short period of time. Once the order is received at a fulfillment center, the items are retrieved from their respective locations and delivered to a distribution station, where the items are prepared for delivery to customers, e.g., by placing the items into one or more boxes or other containers with an appropriate amount or type of dunnage, and by loading the items onto a delivery vehicle (e.g., a truck) for outbound delivery to the customer. Typically, the items are loaded into one or more delivery vehicles at a loading dock or like facility associated with the distribution station.

Frequently, workers who load items onto delivery vehicles at a loading dock or like facility are subject to a number of potentially hazardous conditions. For example, although the conditions within the fulfillment centers themselves are climate-controlled to a certain degree, a loading dock is, by its very nature, exposed to the environmental conditions outside of the fulfillment center. Therefore, where the fulfillment center is located in a warm climate, e.g., the southwestern United States, temperatures experienced by workers in the loading dock may regularly exceed one hundred degrees Fahrenheit (100° F.) while loading items. Conversely, where the fulfillment center is located in a cold climate, e.g., New England, workers may seasonally encounter brutally cold temperatures and biting winds while loading items, particularly in winter months, which coincide with traditionally high volumes of sales and distributions. Moreover, a large number of injuries within the fulfillment center environment typically occur at loading docks, as workers must manually carry, lift and stack items of varying weights to different elevations within the delivery vehicle, and to ensure that the items are properly stabilized within delivery vehicle prior to their departure.

Given the extent of human interaction that is required to physically move items into a desired position at a fulfillment center, e.g., from a distribution station into a proper position aboard a delivery vehicle at a loading dock, and the occasionally adverse working conditions that may be encountered there, the loading dock is frequently the site of the highest turnover and the lowest morale and job satisfaction levels among employees within the fulfillment center environment.

BRIEF DESCRIPTION OF THE DRAWINGS

FIG. 6B shows one embodiment of an automated loading system in accordance with embodiments of the present disclosure.

DETAILED DESCRIPTION

As is set forth in greater detail below, the present disclosure is directed to automatically loading items at a given location using one or more cable robots. Specifically, the systems and methods disclosed herein may provide a carrier that is configured to receive an item from an extrinsic source, e.g., by way of a conveyor, and may be moved from one location to another in multiple degrees of freedom through the use of a cable robot. The carrier may be a discrete component that is independently mobile with respect to the conveyor, or may be integral to the conveyor, and may be suspended or positioned by way of one or more cables that are controlled using independent tensioning actuators. Further, the carrier may also include an apparatus or feature such as an onboard conveyor that is configured to cause an item to be received thereon, e.g., at a terminus of the conveyor, and to expel the item therefrom when the carrier is within a vicinity of a desired location.

Figure 1A:
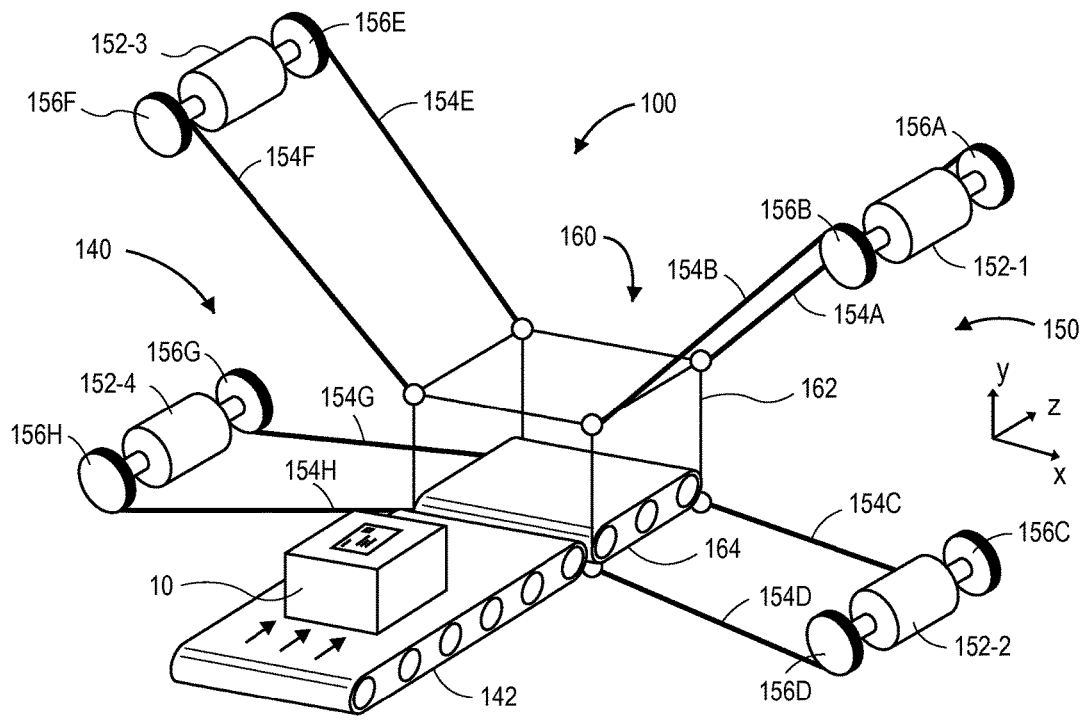
FIGS. 1A and 1B show one embodiment of an automated loading system in accordance with embodiments of the present disclosure.
Figure 1B:
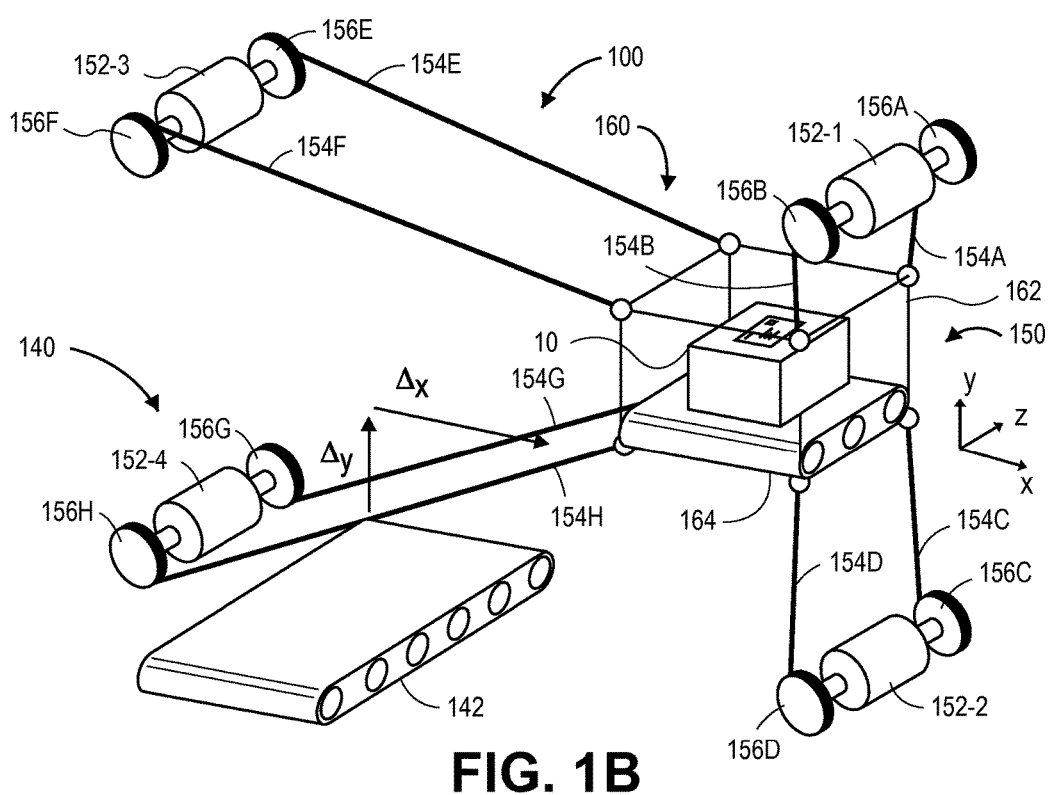

Referring to FIGS. 1A and 1B, a system 100 including an automated loader 140, a cable robot 150 and a carrier 160 is shown. As is shown in FIG. 1A, the automated loader 140 includes a conveyor 142 transporting an item 10 thereon in a direction of the cable robot 150 and the carrier 160, e.g., in a z-direction. The cable robot 150 includes a plurality of tensioning actuators 152-1, 152-2, 152-3, 152-4, each of which is connected in tension to the carrier 160 by way of a cable 154A, 154B, 154C, 154D, 154E, 154F, 154G, 154H provided around a series of pulleys 156A, 156B, 156C, 156D, 156E, 156F, 156G, 156H, and may thus transport the carrier 160 in an x-direction and a y-direction. The carrier 160 is provided at a terminus of the conveyor 140, and includes a cage 162 and a conveyor 164. The cage 162, which is in the shape of a rectangular hollow and provides support to the conveyor 164, may thus be manipulated in the x-direction and/or in the y-direction by extending or recoiling one or more of the cables 154A, 154B, 154C, 154D, 154E, 154F, 154G, 154H about the pulleys 156A, 156B, 156C, 156D, 156E, 156F, 156G, 156H in concert using the corresponding tensioning actuators 152-1, 152-2, 152-3, 152-4.

Referring to FIG. 1B, the system 100 is shown after the item 10 has been received by the carrier 160 by way of the conveyor 164, and after the carrier 160 has been elevated by a distance $\Delta y$ and translated by a distance $\Delta x$ into a new position by the corresponding tensioning actuators 152-1, 152-2, 152-3, 152-4. Once the carrier 160 is in the new position, the carrier 160 may expel the item 10, also by way of the conveyor 164, and return to the terminus of the conveyor 140, where the carrier 160 may be prepared to receive another item (not shown) from the conveyor 140.

Accordingly, the systems and methods of the present disclosure, such as the system 100 of FIG. 1A, may utilize one or more cable robots to reposition a carrier of an item in one or more dimensions by extending or retracting lengths of cable mounted to the carrier, as necessary. Once the cable robots have placed the carrier in a desired position, the item may be ejected from the carrier to a desired location, and the carrier may be returned to its original location using the one or more cable robots. In this regard, a carrier such as the carrier 160 of FIGS. 1A and 1B may be configured to receive items that are traveling at a relatively high rate of speed at an origin, to promptly lift and/or translate the carrier to a desired fixed or mobile position using one or more cable robots, to deposit the item onto one or more other fixed or mobile surfaces at the desired position before returning to the origin using the one or more cable robots. For example, the carrier may be configured to receive or otherwise load items thereon from one or more fixed or moving sources, including surfaces that are fixed in position, such as the conveyor 140 of FIGS. 1A and 1B, or surfaces that are in motion, such as one or more surfaces of an autonomous mobile robot, and may be further configured to expel or discharge such items onto one or more fixed or moving destinations, including surfaces that are fixed in position, such as shelves, tables, platforms or pallets, or surfaces that are in motion, such as one or more surfaces of another autonomous mobile robot. In accordance with the present disclosure, items may thus be received and repositioned with little to no human effort or contact, regardless of the environmental conditions where the carrier and the one or more cable robots are located, subject to any pertinent effective constraints of the carrier or the cable robots, which may operate alone or in tandem with one another.

Fulfillment centers (which may also be called fulfillment and distribution centers, distribution centers, warehouses, shipment preparation facilities, processing facilities, or other like terms) may be associated with an online marketplace for the purposes of receiving, storing and distributing items that are made available to customers at the online marketplace. Such facilities may include receiving stations or docks at which shipments of items arriving by car, truck, train, ship, aircraft (e.g., manned or unmanned aircraft, such as drones), or any other means may be received and processed. Additionally, fulfillment centers may also include storage areas or regions having shelves, bins, racks, tiers, bars, hooks or other like storage means arranged in a fixed or flexible two-dimensional or three-dimensional layout, in which items may be stored until an order for one or more of the items is received. Fulfillment centers may further include distribution stations or facilities at which shipments of one or more items may be packed and prepared for delivery to customers in response to an order, such as by placing the items in a container (e.g., an envelope, a bag, a crate or a box) with a sufficient amount or type of dunnage, as well as stations or docks for causing such shipments to be delivered to customers by car, truck, train, ship, aircraft (e.g., manned or unmanned aircraft, such as drones), or any other means.

The various stations, areas or regions of a fulfillment center may be accessed by human operators or machines, which may remove items from one or more containers of inbound shipments arriving at a receiving station, place the items in storage in one or more regions or spaces within a storage area, retrieve the items from such regions or spaces within the storage area and transfer the items to the distribution station for packing, preparation and delivery to customers. Such operators or machines are typically provided with a list or registry of items to be retrieved, along with instructions to retrieve them. The operators or machines may traverse through the fulfillment center, retrieve the items that are included in one or more orders from their designated locations within the storage area, and transport the items to the distribution station in preparation for delivery to customers, where the items will be collated into one or more shipments to the customers who placed the orders for such items, the destinations to which the items should be delivered, or on any other logical basis.

A distribution station at a fulfillment center may serve as a transition zone within which a shipment containing one or more items ordered by a customer that are maintained in a storage area or region of the fulfillment center may be prepared for delivery, and from which the shipment may be delivered to the customer. In this regard, a distribution station may include one or more regions or surfaces that may temporarily accommodate the one or more items that are to be included in a shipment, or in multiple shipments of a batch, until such items may be prepared for delivery. For example, items to be included in a number of shipments may arrive at the distribution station in a first container or vessel, and a worker may sort the items into multiple containers or vessels, each corresponding to the respective shipments. Such regions or surfaces may include one or more shelves, racks, slots or bins, and may be maintained in a fixed structure (e.g., mounted within or onto a wall) or provided in the form of one or more mobile structures (e.g., carts).

Thus, when an order is received at a fulfillment center, a first worker may retrieve the items to be included in a shipment or in multiple shipments from their respective spaces in a storage area, place such items into one or more containers or vessels, and transport such items in the one or more containers or vessels to a distribution station, where a second worker may manually remove the items from the containers or vessels and place the items into predetermined regions of the distribution station on a temporary basis corresponding to a unique shipment of the items. Subsequently, one or more additional workers may retrieve the items that are to be included in the unique shipment from the predetermined region, and pack and prepare the items of the shipment for delivery. Because the preparation of outbound shipments of ordered items necessarily involves a number of workers who must transport, deposit, sort, prepare and pack items that are to be included in the orders, the distribution station is a fast-paced environment with remarkably high levels of traffic of both personnel and items which are coming from and departing to countless destinations.

After the ordered items are packed into one or more containers, the containers must be loaded from the distribution station into one or more delivery vehicles (e.g., trucks, vans, trailers, aircraft, ships or railway cars) at a loading dock, a loading bay, or another like facility. Such vehicles may be temporarily joined to the loading dock, or provided adjacent to the loading dock, e.g., backed up to the loading dock, for the purpose of loading a plurality of items thereon. The items may be manually carried onto the vehicles, or loaded onto one or more conveyors and transported into the vehicles. For example, an extensible conveyor may be extended into an open vehicle in order to aid in the delivery of the items into a rear of the vehicle, and may be gradually withdrawn as workers remove the items arriving by way of the extensible conveyor and stack the items therein to fill the vehicle.

The amount of energy and the number of interactions that are required in order to manually sort items for delivery, or to load items onto a vehicle, may commonly result in delays, errors or discrepancies, and lead to dissatisfaction among the workforce at a fulfillment center. For example, workers at a distribution station who receive items in a container or vessel and deposit the items into a predetermined location or sort the items into one or more other containers or vessels are required to bend down, stand up or rotate, and lift or lower items of various sizes, dozens of times per day. Additionally, workers who load items onto a delivery vehicle at a loading dock must often deal with extreme temperatures and adverse environmental or other working conditions, which may cause a number of injuries, incomplete or incorrect deliveries, damaged items or procedural violations, or lead to any number of other unfavorable results.

Cable robots are a specific class of parallel robotic manipulator in which an end effector is supported by a plurality of cables, each associated with a tensioning motor or actuator, such that the three-dimensional positions and orientations of the end points where each of the cables contacts the end effector may be controlled in an independent manner with respect to the other end points by applying or changing tension to the corresponding cable. Cable robots provide an end effector with a relative large range of motion and require less space, as compared to other robots, yet experience relatively lower amounts of rotational inertia. Because the position and orientation of the end effector is controlled by extending or retrieving lengths of lightweight, high-tension cables, a cable robot may be provided with a relatively low mass and in large work environments, wherein the tensioning motors or actuators may be mounted in locations that do not restrict, or restrict only to a limited extent, the range of motion of the end effector. The gravitational pulls on the masses of the cables and the end effector ensure that a sufficient amount of tension exists in each of the cables regardless of their positions or orientations with respect to the end effector and the tensioning motors or actuators. A cable robot may feature any number of tensioning motors or actuators, cables and/or pulleys, and the cables may be joined at the end effector at a single point or at multiple points, either directly or indirectly by way of one or more pulleys. One or more tools or operators may be provided at the end effector, such that the cable robot may be used to enable the operation of the tools or operators in any number of positions in two-dimensional or three-dimensional space.

The present disclosure is directed to automatic loading systems, and methods for automatically loading items such as consumer products, containers or vessels housing such products, or packages or parcels including one or more of such products or such containers, in a fulfillment center environment. More specifically, the systems and methods disclosed herein may utilize carriers that are mounted to a cable robot and provided at a terminus of a conveyor, and are thus configured to receive items arriving on the conveyor. The carrier may be a distinct unit from the conveyor, such that the cable robot is provided to manipulate the carrier independently from the conveyor, from an origin in a vicinity of the terminus of the conveyor to one or more other locations. Alternatively, the carrier may be joined to the terminus of the conveyor, e.g., an articulating conveyor or other articulated loading system, such that the cable robot may cause the carrier and the terminus of the conveyor to move in tandem with one another, from the origin to one or more of the other locations.

In this regard, the carriers and cable robots of the present disclosure may be utilized to receive items from one or more fixed or moving sources, and to deposit such items onto one or more fixed or moving destinations. For example, the items may be placed or loaded onto one or more carriers by way of a conveying system having one or more conveyors that may be provided in a linear alignment, e.g., extending from a source of such items to the one or more carriers. An order by which the items are caused to enter the conveying system or otherwise placed onto the one or more conveyors may be selected on any basis, including but not limited to an order in which the items are to be utilized, e.g., transferred into a delivery vehicle, loaded onto a pallet, received by one or more autonomous mobile robots or operated in any other manner, as well as a time by which the items must arrive at a given location, or a time at which the items must be transported in order to timely arrive at the given location. Additionally, such conveyors may be provided in a looped configuration or system that permits a plurality of items to accumulate or otherwise be collected therein, such that one or more of the items may be diverted therefrom as desired, and in a particular order, and transported to one or more carriers of the present disclosure. Further, the items may be loaded onto the carriers from one or more moving surfaces, e.g., an autonomous mobile robot, according to any number of methods, such as by placing a carrier within a vicinity of a moving surface at a substantially equal velocity, and transferring an item from the moving surface to the carrier while the item is within the vicinity and traveling at the substantially equal velocity.

Once a carrier receives an item thereon, the cable robot may reposition the carrier to a spatial position that is proximate to a desired location for the item using the cable robot, and to expel the item at the desired location. The carrier may receive items thereon and expel items therefrom by any means, such as one or more other conveyors, e.g., the conveyor 164 of the carrier 160 of FIGS. 1A and 1B, that may be adapted to start and stop, as necessary, in order to receive items at the terminus of the conveyor and to expel items at their desired locations. Such other conveyors may be provided on the carrier in any alignment or orientation, including substantially horizontally, such as the conveyor 164 of the carrier 160 of FIGS. 1A and 1B. Alternatively, the carrier may include two or more induction conveyors or side conveyors that are aligned substantially vertically, and configured to receive one or more items therebetween at a first location, i.e., to induct the one or more items in compression between the two or more conveyors, and to expel the one or more items therefrom at a second location. According to some other embodiments, a carrier may include two or more rotatably driven induction wheels that may be opposed to one another and aligned to pull items from the terminus of the conveyor onto the carrier, thereby receiving the items therebetween, and to push items from the carrier onto the desired location after the carrier has been appropriately positioned by the cable robot.

After a carrier has expelled an item therefrom, the cable robot may return the carrier to the origin, either by repositioning the carrier to the terminus of the conveyor at the origin, or by transporting the carrier and the terminus together to the origin, where another item may be received from the conveyor.

Accordingly, the use of a carrier that may be manipulated by a cable robot into one or more desired positions may enable items to be received from a conveyor or like means and placed in an appropriate location quickly and efficiently, in series, and with limited interaction with humans, regardless of the environmental or other working conditions in the vicinity of the conveyor. Alternatively, those of ordinary skill in the pertinent arts will recognize that items may be transferred from carriers that may be manipulated by cable robots in as many modes or manners by which the items may be received onto such carriers. For example, items may be transferred from a carrier onto one or more fixed or moving surfaces, including but not limited to any type of shelves, tables, platforms or pallets, or any number of conveying surfaces or autonomous mobile robots, in accordance with the present disclosure.

Additionally, the systems and methods of the present disclosure may be further utilized to generate or determine an order by which items are to be received onto a carrier and loaded onto one or more fixed or moving surfaces, e.g., into a delivery vehicle or onto a shelf, a table, a platform or a pallet, or a location onto such fixed or moving surfaces where the items are to be placed. The order may be derived based on any relevant facts regarding the items, including but not limited to the dimensions or masses of one or more of the items, the values of the items, a level of hazardous material provided in one or more of the items, a designation by a customer or a vendor regarding standards or conditions of treatment for the one or more items, a level of fragility or delicateness of the one or more items, or an order by which the items are to be removed from such locations, e.g., an order of destinations at which a delivery vehicle may be expected to arrive.

Figure 2:
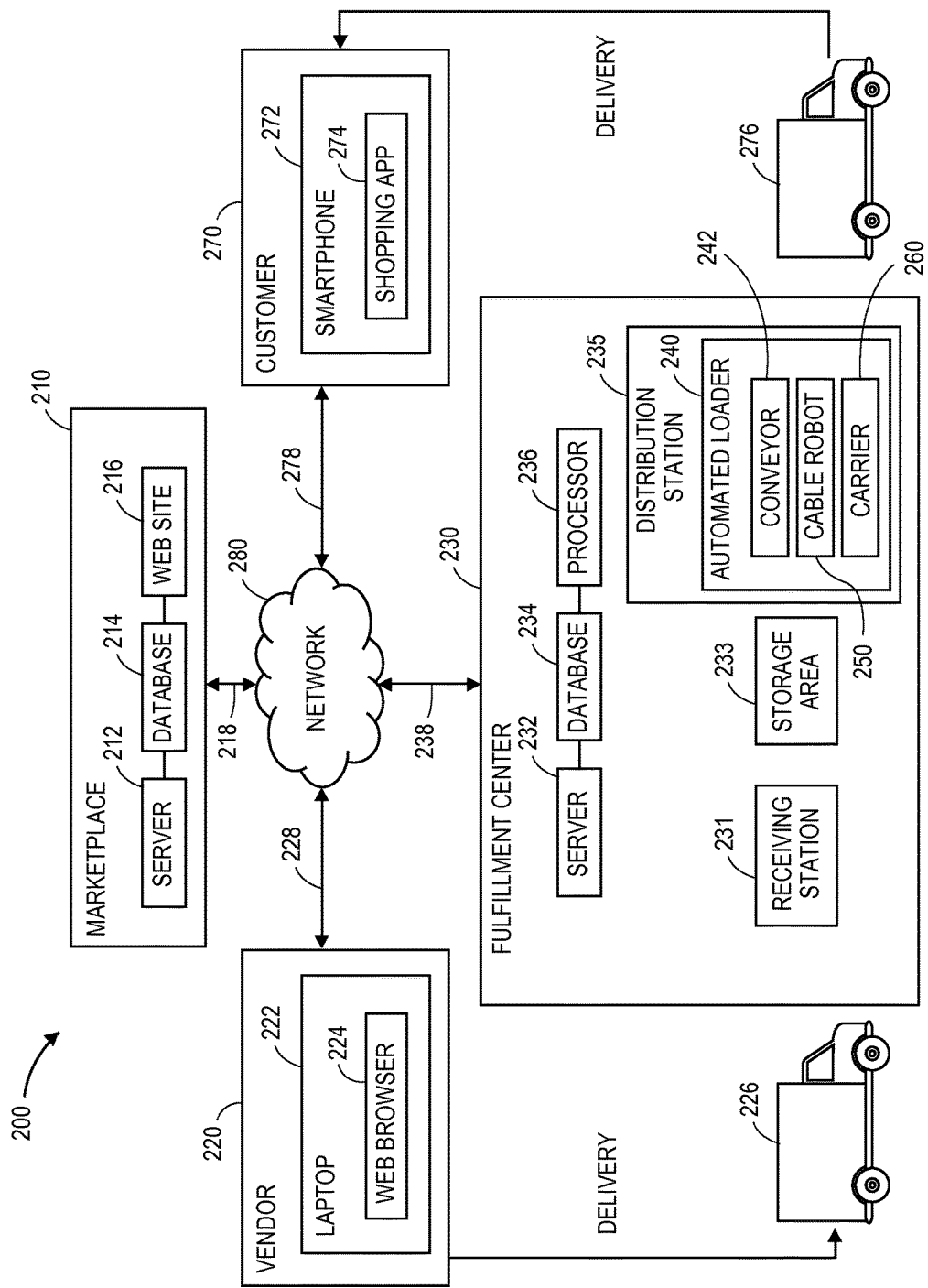
FIG. 2 is a block diagram of components of one embodiment of an automated loading system in accordance with the present disclosure.

Referring to FIG. 2, a block diagram of components of one system 200 for the automated loading of objects in accordance with embodiments of the present disclosure is shown. The system 200 includes a marketplace 210, a vendor 220, a fulfillment center 230 and a customer 270 that are connected to one another across a network 280, such as the Internet. Except where otherwise noted, reference numerals preceded by the number "2" in FIG. 2 indicate components or features that are similar to components or features having reference numerals preceded by the number "1" shown in FIG. 1A or FIG. 1B.

The marketplace 210 may be any entity or individual that wishes to make items (e.g., goods, services, media or information of any kind or form) from a variety of sources available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may contain any type of information regarding items that have been made available to customers through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, by way of one or more vehicles, including but not limited to delivery vehicle 226. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations 231, storage areas 233 and distribution stations 235.

The fulfillment center 230 also includes one or more workers (not shown), who may be any designated personnel tasked with performing one or more tasks within the fulfillment center 230. Such workers may handle or transport items (e.g., any type or form of good, product, media or other tangible consumer article) within the fulfillment center 230, operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations 231 featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers.

The fulfillment center 230 may also include one or more predefined two-dimensional or three-dimensional storage areas 233 including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations 235 where items that have been retrieved from a designated storage area 233 may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones), including but not limited to delivery vehicle 276.

As is shown in FIG. 2, the distribution station 235 includes an automated loader 240 having a conveyor 242, a cable robot 250 and a carrier 260. The conveyor 242 may be any type or form of powered or powerless conveying apparatus that may be used to transport objects, items or materials of varying sizes and shapes, and may typically include any number of machines or elements for causing the motion or translation of such objects, items or materials from one location to another. Additionally, any form of mover, e.g., belts, chains, screws, tracks or rollers, may drive the machines or elements that cause or enable such motion or translation and the objects, items or materials may be transported by the conveyor 242 in a container or carrier, or on or within the mover itself. The conveyor 242 may further include one or more pulleys, shafts, hubs, bushings, sprockets, bearings and other elements for causing a movement of the conveyor. Additionally, the conveyor 242 may be fixed in position or mobile. For example, the conveyor 242 may be extended into a delivery vehicle or other confined space into which items are to be transported, and gradually withdrawn as the vehicle or other confined space is filled with items arriving on the conveyor 242.

Any type of conveying system may be provided in the conveyor 242. For example, the conveyor 242 may include a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, the conveyor 242 may further include a chain conveyor for carrying one or more pendants, which may be used to pull unit loads on pallets or in other large-scale containers. The conveyor 242 may also include a gravity conveyor, which may consist of a series of rollers that may be used to move objects based on a difference in height, and a resulting difference in gravitational potential energy, without the use of a motor, or any other type of conveyor known to those of ordinary skill in the pertinent arts. Additionally, those of ordinary skill will further recognize that any type or number of conveyors may be used, in series or in parallel, in accordance with embodiments of the present disclosure.

The cable robot 250 may include one or more tensioning motors or actuators each having a cable connected to a portion of a carrier or platform for supporting one or more items thereon. The cable robot 250 may further include one or more components for controlling the positioning of the carrier or platform including but not limited to pulleys, reels, reel drives, roller drives, cable position and speed sensors, tension sensors or any other operational sensors (e.g., tachometers, temperature sensors or the like). The cable robot 250 may be provided in any areas or environments of any dimension, including an open, substantially unbounded area within a fulfillment center, or a confined space of defined dimensions, such as an interior of a trailer or other delivery vehicle. Additionally, the respective tensioning motors or actuators may be individually controlled in order to cause the carrier or platform to be moved to any fixed or moving position within range of the motors or actuators, and at any angle, through the use of one or more manual or automatic controllers (not shown) that may be associated with one or more computer devices, e.g., the server 232.

The carrier 260 may be any element or feature provided at an end effector or other controllable element of the cable robot 250 that may be configured to receive one or more items thereon and to expel the one or more items therefrom. The carrier 260 may thus include one or more conveying systems, such as the conveyor 164 of the system 100 of FIG. 1A and FIG. 1B, or one or more other combinations of conveyors or conveying systems that may be individually programmed to accept an item at a first position and to discharge the item after having been moved to a second position by the cable robot 250.

Moreover, the fulfillment center 230 may further include one or more control systems (not shown) that may generate instructions for conducting operations at the fulfillment center 230, including but not limited to general operations at the receiving station 231, the storage area 233 or the distribution station 235, or the specific operations of one or more of the conveyor 242, the cable robot 250 and the carrier 260. Such control systems may be any type or form of electronic device or software module configured to control the operation of the conveyor 242, the cable robot 250 or the carrier 260 by generating commands for operating the conveyor 242, the cable robot 250 or the carrier 260 based on information received from the server 232 of the fulfillment center 230, the server 212 of the online marketplace 210, or from any other external computing device via the network 280. For example, the control systems may transmit one or more control signals to the individual tensioning motors or actuators of the cable robot 250, as well as one or more conveyors, induction wheels or other components of the carrier. In response to such control signals, one or more items may be transported on the conveyor 242 to the cable robot 250, which may receive the items on the carrier 260 and be raised or lowered to a defined vertical elevation or alignment, or translated forward, rearward, to the left or to the right in a defined horizontal direction to a lateral alignment, as necessary. The control systems may be associated with any form of motors, power sources or other components in accordance with the present disclosure, along with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, e.g., by way of the delivery vehicle 276, or directly from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Additionally, such computers, servers, devices and the like may include or comprise one or more programmable logic controllers having volatile or non-volatile memory components. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Additionally, those of ordinary skill in the pertinent arts will recognize that the various computers or computer components may be physically provided in one or more of the environments disclosed herein or, alternatively, may be provided virtually in association with one or more such environments, e.g., in the "cloud." For example, referring again to the fulfillment center 230, one or more of the server 232, the database 234 or the processor 236 may be physically provided within one or more structures associated with one or more of the receiving station 231, the storage area 233 or the distribution station 235 or, alternatively, may be provided in one or more remote locations and made accessible to one or more computers or computer components provided within the fulfillment center 230. Likewise, those of ordinary skill in the pertinent arts will further recognize that the data and/or instructions, programs, firmware, software or the like described herein may be provided on one or more computers or computer components in a physical location described herein or, alternatively, may be virtually provided on one or more computers or computer components that may be remotely accessed from one or more of the physical locations described herein in accordance with the present disclosure.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily with regard to the use of a carrier or platform provided on a cable robot and configured to reposition items at a distribution station, e.g., from one fixed or moving surface to another fixed or moving surface, and within a fulfillment center or within a delivery vehicle associated with a loading dock of the fulfillment center, such as is shown in FIGS. 1A and 1B. As will be recognized by those of skill in the art, however, the systems and methods disclosed herein may also be used in many other situations, and their utility is not limited to any of the preferred embodiments described herein.

Figure 3:
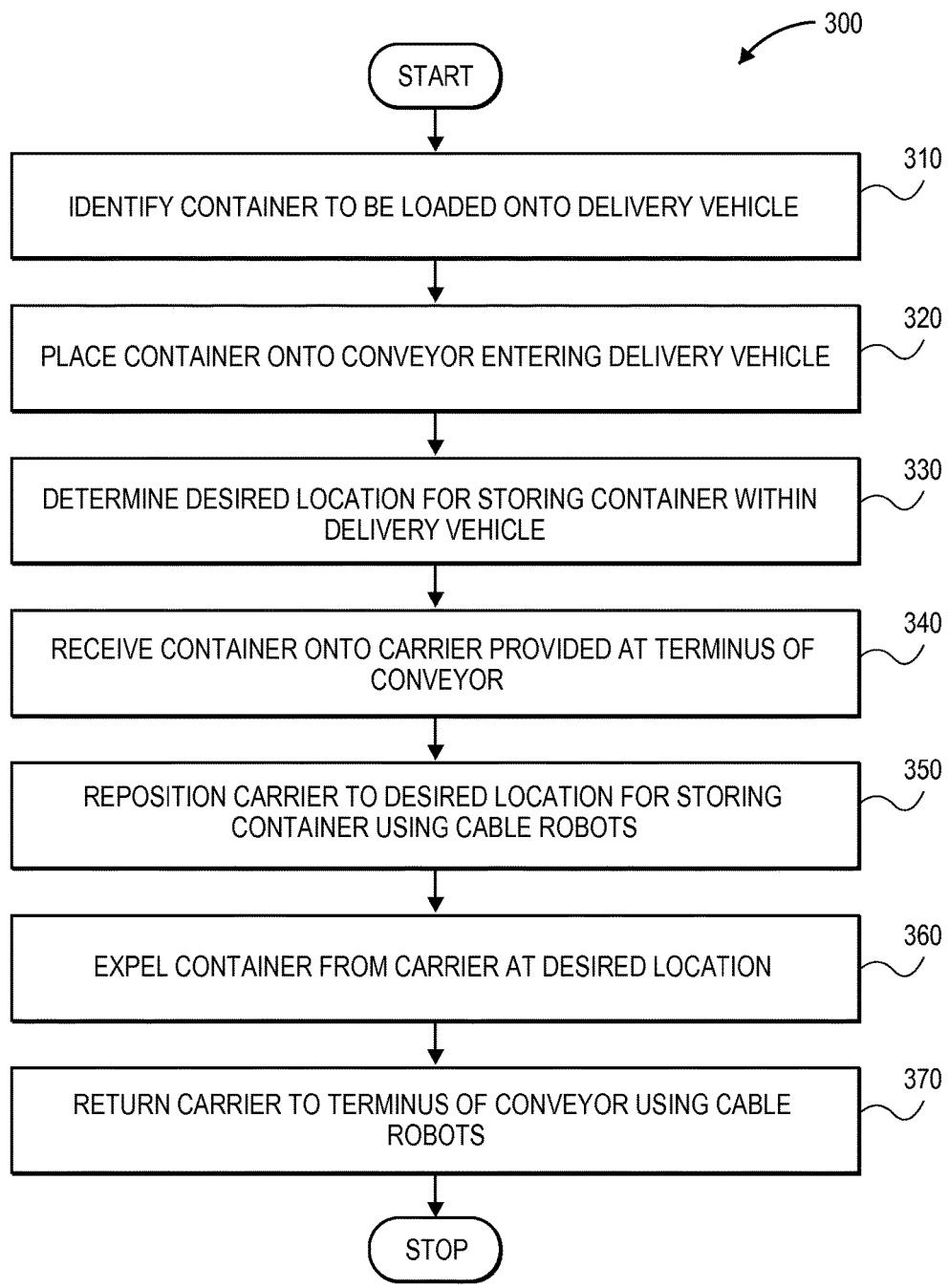
FIG. 3 is a flow chart of one process that may be performed by one embodiment of an automated loading system in accordance with the present disclosure.

Referring to FIG. 3, a flow chart 300 of one process that may be performed by one embodiment of an automated loading system in accordance with the present disclosure is shown. The flow chart 300 begins at box 310, where a container that is to be loaded onto a delivery vehicle is identified. For example, the container may have been prepared and packed with one or more items based on an order provided by a customer, and assigned to a specific delivery vehicle for shipment to the customer. At box 320, the container is placed onto a conveyor entering the delivery vehicle, and at box 330, a desired location for storing the container is determined. For example, the container may be placed on a conveyor, such as the conveyor 142 of FIGS. 1A and 1B, which may be inserted into a delivery vehicle, e.g., a rear door of a truck, and a specific location within the delivery vehicle may be selected and assigned to the container on any basis. The desired location may be determined by any means, such as by identifying the container from one or more markings thereon (e.g., address labels, bar codes or sets of alphanumeric characters) as the container travels along the conveyor, e.g., using one or more cameras or other imaging devices configured to recognize such markings, and determining one or more attributes or characteristics of the container, including a mass (or weight) of the container, dimensions (e.g., a length, a height or a width) of the container, an area of one or more faces or surfaces of the container (e.g., a surface onto which the container is intended to rest within the delivery vehicle) or a volume of the container, a value of one or more items within the container, whether the container includes hazardous materials and/or a level of hazard associated with such materials, any designations provided upon the container by a seller, a vendor, a manufacturer, a merchant or a customer, any level of fragility or delicateness of the one or more items, as well as an origin or a destination for the container.

The identification of locations for items to be stored within the delivery vehicle typically begins at a lower level of the delivery vehicle, and may then provide for stacking or supporting items on top of other items already stored there. In accordance with the present disclosure, items are preferably stored within a delivery vehicle such that the items that are to be removed soonest, e.g., at one or more earlier stops of the delivery vehicle along a route, are stored near a rear end of the delivery vehicle, or near a door or other access to the delivery vehicle, while items that are to be removed latest, e.g., at one or more later stops of the delivery vehicle along the route, are stored near a front end of the delivery vehicle, or farthest from the door or other access to the delivery vehicle. Additionally, and also in accordance with the present disclosure, items are preferably stored within the delivery vehicle such that the heaviest or most durable items are stored at or near a bottom or lowest surface of the delivery vehicle, with progressively lighter or less durable items stacked thereon.

At box 340, the container that was placed onto the conveyor at box 320 is received onto a carrier provided at a terminus of the conveyor. For example, referring again to the system 100 of FIG. 1A, the item 10 may be received onto the conveyor 164 within the cage 162 after arriving at the carrier 160 on the conveyor 142. Alternatively, an item may be received on a carrier or platform using any type or form of machine, including but not limited to two or more induction wheels that may receive and grip the item thereon.

At box 350, the carrier is repositioned to a desired location for storing the container using one or more cable robots. For example, referring again to the system 100 of FIG. 1B, the various tensioning actuators 152-1, 152-2, 152-3, 152-4 may be operated in concert to extend or retract the respective cables 154A, 154B, 154C, 154D, 154E, 154F, 154G, 154H about the pulleys 156A, 156B, 156C, 156D, 156E, 156F, 156G, 156H, as necessary, in order to lift the carrier 160 by a distance $\Delta y$ and to move the carrier 160 by a distance $\Delta x$ to a new location. At box 360, the container is expelled from the carrier at the desired location. For example, referring again to the system 100 of FIG. 1B, the conveyor 160 may cause the item to be advanced forward and beyond an end of the conveyor, onto an underlying shelf, platform or other surface, such as a top surface of another container already deposited within the carrier at the desired location.

At box 370, the carrier is returned to the terminus of the conveyor using the cable robots, and the process ends. For example, referring again to the system 100 of FIG. 1B, the operations of the various tensioning actuators 152-1, 152-2, 152-3, 152-4 which caused the respective cables 154A, 154B, 154C, 154D, 154E, 154F, 154G, 154H to extend or retract, thereby lifting and moving the carrier 160 to the new location, could be reversed in order to return the carrier to the terminus of the conveyor 142, where the carrier 160 could be aligned to receive another container thereon.

Figure 4A:
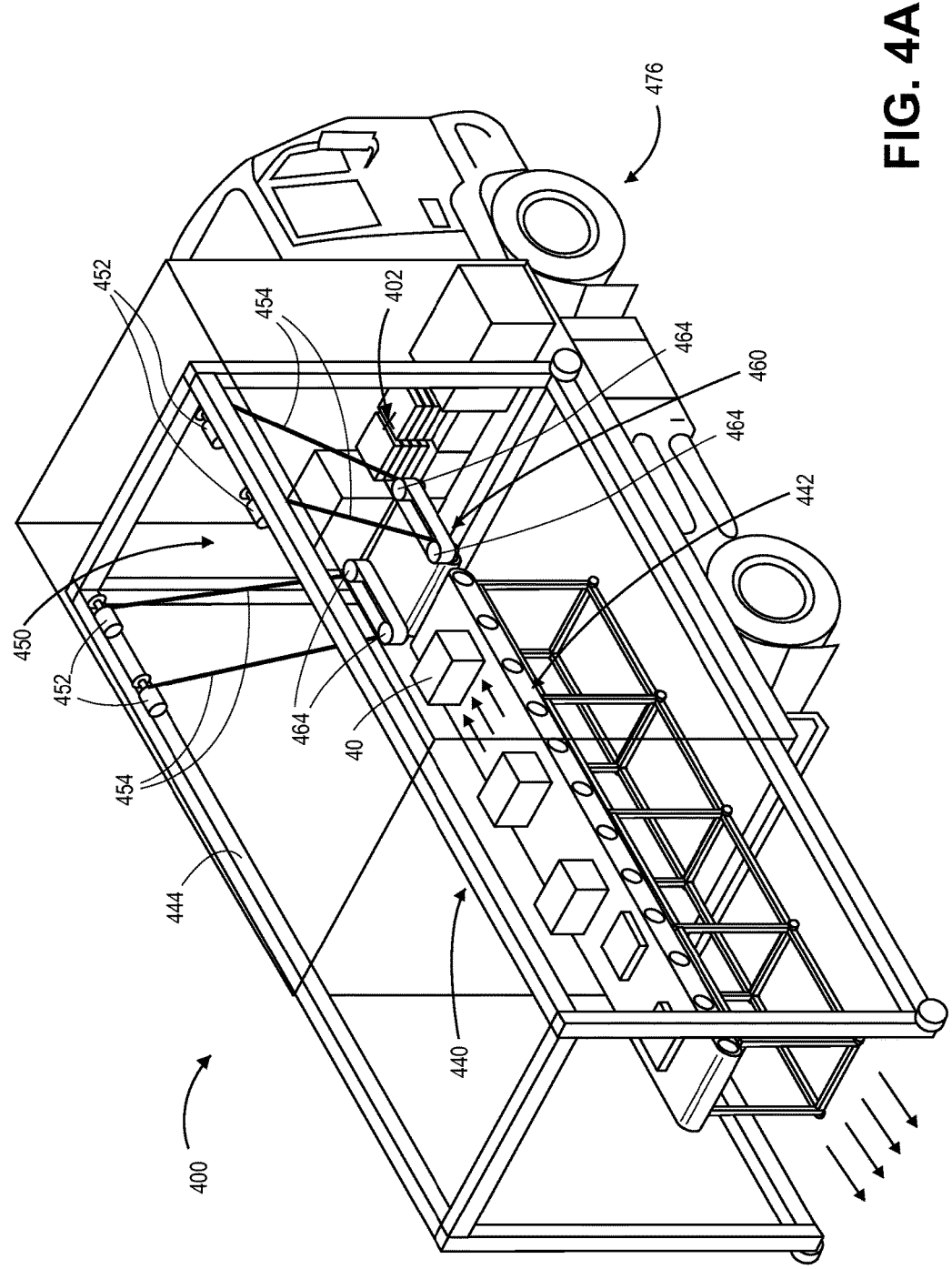
FIGS. 4A and 4B show one embodiment of an automated loading system in accordance with embodiments of the present disclosure.
Figure 4B:
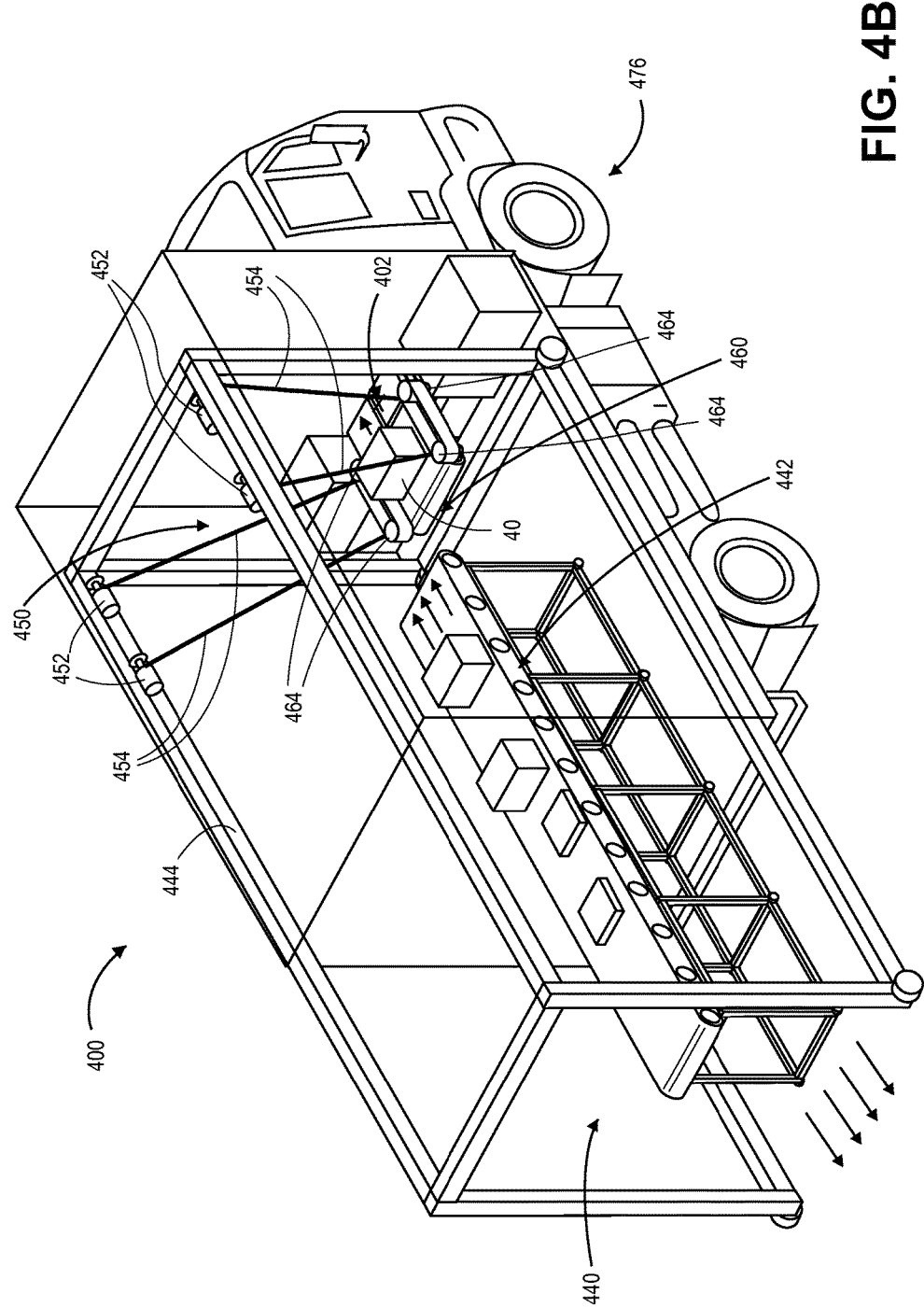

As is discussed above, the systems and methods of the present disclosure, including but not limited to the process represented in the flow chart 300 of FIG. 3, may be utilized to move items from one location to another using one or more cable robots provided in any applicable environment, including a receiving station, a storage area or a distribution station, or to load items into (or remove items from) a delivery vehicle. Referring to FIGS. 4A and 4B, a system 400 including an automated loader 440, a cable robot 450, a carrier 460 and a delivery vehicle 476 (e.g., a truck or a trailer) is shown. Except where otherwise noted, reference numerals preceded by the number "4" in FIG. 4A or FIG. 4B indicate components or features that are similar to components or features having reference numerals preceded by the number "2" shown in FIG. 2, or by the number "1" shown in FIG. 1A or FIG. 1B.

As is shown in FIG. 4A, the automated loader 440 includes a conveyor 442 and a frame 444. The conveyor 442 and the frame 444 are removably inserted into the vehicle 476, at least in part, and may be provided in a modular or adjustable format, such that the lengths or other dimensions of the conveyor 442 or of the frame 444 may be modified based on the dimensions or capacities of the vehicle 476, or on any other factor. The conveyor 442 and the frame 444 may be guided therein by any means or method that may be known to those of ordinary skill in the pertinent arts, including but not limited to one or more vision-guiding or depth-guiding systems that determines dimensions, topologies or other features of the interior volume within the vehicle 476, or any other systems or methods for performing the same or a similar function.

The conveyor 442 is configured to transport an item 40 thereon into the vehicle 476, and in a direction of the cable robot 450 and the carrier 460. The conveyor 442 and the frame 444 may be configured to be withdrawn from the vehicle 476 as the vehicle 476 is filled with items. The cable robot 450 includes a plurality of tensioning actuators 452, each of which is mounted to the frame 444 and connected in tension to the carrier 460 by way of a cable 454. The carrier 460 includes a pair of opposed induction conveyors 464 that are substantially vertically aligned and configured to automatically receive an item therebetween on the carrier 460 at a terminus of the conveyor 442, and to expel the item therefrom when the carrier 460 is in a desired position. The induction conveyors 464 may be operated by one or more controllers (not shown), and may be provided in any other relevant alignment that permits items to be fixed therebetween or onto the carrier 460 in another manner, and to be expelled from the carrier 460 thereby, including but not limited to substantially horizontal alignments, or alignments at one or more non-horizontal and non-vertical angles.

As is discussed above, the systems and methods of the present disclosure are directed to automatically placing one or more items in a desired location through the use of one or more cable robots. Referring to FIG. 4B, the system 400 is shown with the carrier 460 having lowered and moved the item 40 into a position that permits the induction wheels 464 to expel the item 40 onto one or more items that were previously deposited onto the delivery vehicle 476. The item 40 is placed into the position by the cable robot 450, which operates the tensioning actuators 452 in concert to extend or retract, as necessary, the corresponding lengths of cable 454 to cause the carrier 460 to move accordingly. When a plurality of items are placed at a front of the vehicle 476 in sufficiently large stacks, the automated loader 440 may be withdrawn to permit the carrier 460 to begin depositing additional stacks of items, until the vehicle 476 is adequately filled.

In accordance with the present disclosure, the placement of the items within a delivery vehicle may be determined according to the dimensions, masses or values of the items, as well as the available volume within the delivery vehicle, such that the available volume is efficiently filled by the items, and such that heavier items are placed at or near bottoms of stacks while lighter items are placed at or near tops of stacks. Alternatively, the placement of the items within the delivery vehicle may be determined according to a value of the items, such that higher-value items may be placed within the delivery vehicle without any other items above or atop them, or with a limited number or mass of other items above or atop them. Additionally, the placement of the items may be further determined based on a planned route of the delivery vehicle to two or more destinations, such that the items to be delivered soonest, e.g., to one or more of the earliest destinations along the planned route, are located near an entrance or egress to the available volume of the delivery vehicle, while the items that are to be delivered latest, e.g., to one or more of the final destinations along the planned route, are located farthest from the entrance or egress. In this regard, the systems and methods of the present disclosure may ensure that a delivery vehicle is appropriately and efficiently packed, in a manner that minimizes the prospect of damage to the items (e.g., damage caused by stacking heavier items atop lighter items), and enables workers to remove the items from the delivery vehicle in a simple manner and without having to climb or reach over other items.

Figure 5:
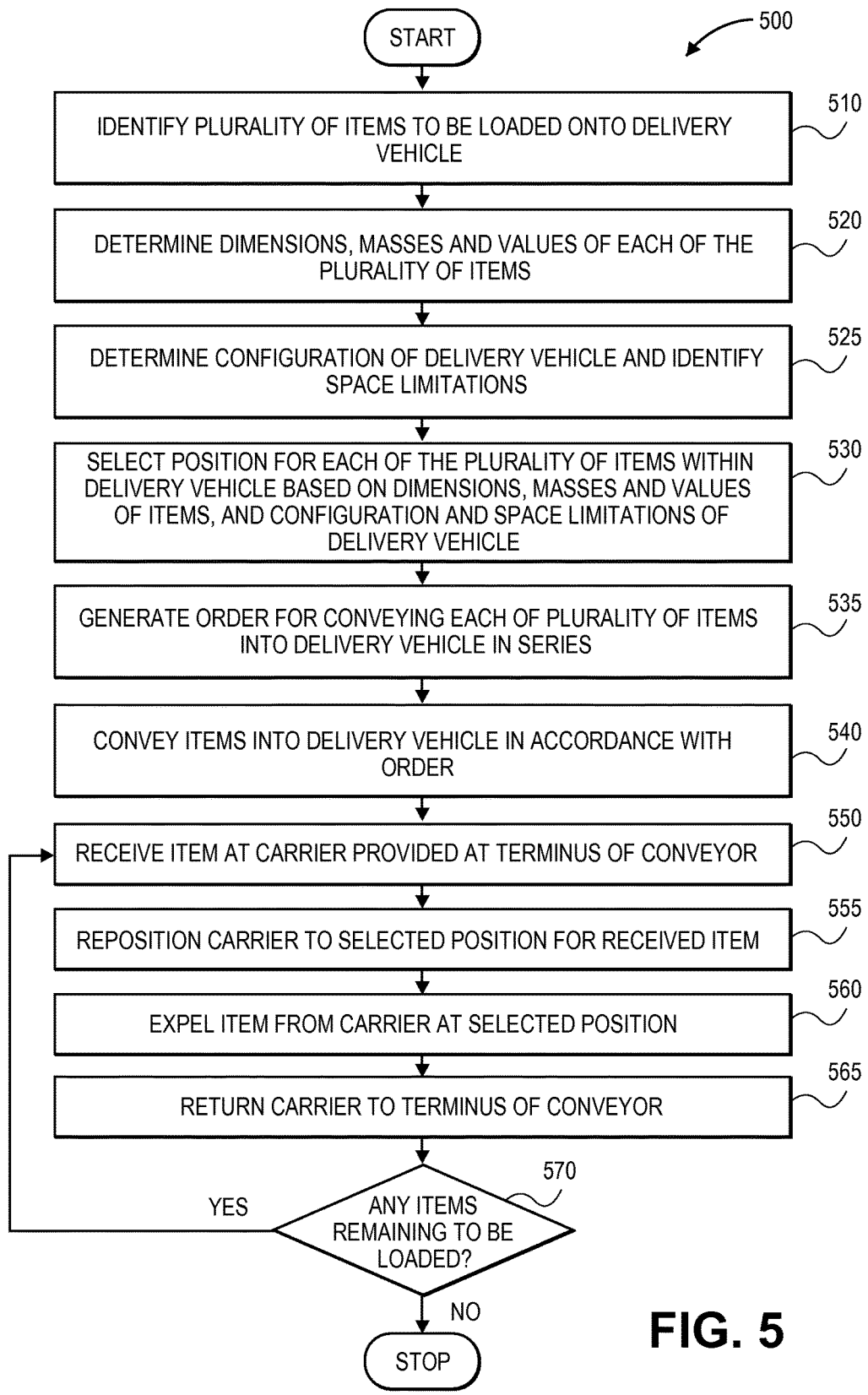
FIG. 5 is a flow chart of one process that may be performed by one embodiment of an automated loading system in accordance with the present disclosure.

Referring to FIG. 5, a flow chart 500 of one process that may be performed by one embodiment of an automated loading system in accordance with the present disclosure is shown. The flow chart 500 begins at box 510, where a plurality of items that are to be loaded onto a delivery vehicle are identified. The items may be included in a single order, or in multiple orders, and the delivery vehicle may be slated to depart from a fulfillment center or like facility for a single destination, or for multiple destinations, as may be desired. At box 520, the dimensions, masses and values of each of the plurality of the items is determined. The masses or weights of the respective items and their containers, as well as the relevant dimensions of the containers, e.g., a length, a width, a height, or a volume, as well as an area of one or more surfaces or faces, and values of the items, may be determined by any means. For example, the dimensions and/or masses of the items or their respective containers may be identified by resort to a look-up table or other record maintained in a database or other data store, or may be determined by manual or automatic measuring means at a distribution station prior to or while preparing the items and/or the containers for delivery. Likewise, the values of the items may also be identified within a look-up table or other record, or, alternatively, may be expressly provided by the vendors, manufacturers, sellers, or other fulfillment centers that provided the items to the fulfillment center, or may be based on purchase prices paid by customers who ordered the items.

At box 525, the configuration of the delivery vehicle is determined, and the space limitations within the delivery vehicle are identified. For example, the number of bays, shelves, dividers or other sectors within the delivery vehicle that may accommodate items within the delivery vehicle, as well as the available volume and/or surface area for receiving items is identified. The delivery vehicle may be empty, or may include one or more other items that have already been received therein, along with any other equipment (e.g., dollies, hand trucks, pads).

At box 530, a position within the delivery vehicle is selected for each of the plurality of items based on the dimensions, masses and values of the items, as well as the configuration and the space limitations of the delivery vehicle. The extent of the delivery vehicle that is available for storing items, e.g., the dimensions, shapes or orientations of the available space, determined at box 525 may be allocated to each of the items to be stored, as necessary, in a manner that enables a worker to easily access the items at a destination, and minimizes the likelihood that one or more of the items will be damaged in transit. For example, items may be assigned to spaces within the delivery vehicle based on their weights or masses, such that heavier items are assigned to be stored on a bottom level of the delivery vehicle and lighter items are assigned to be stacked upon them. Alternatively, the items may be assigned to spaces within the delivery vehicle based on their values, such that higher value items may be placed in specific locations or configurations within the delivery vehicle, or stored without any other items, or with a limited number of other items, above or atop them. Moreover, the items may be assigned to spaces within the delivery vehicle based on their respective destinations, such that items that are intended to be delivered to earlier destinations along a delivery route are stored near an access to the delivery vehicle, while items that are intended to be delivered to later destinations along the delivery route are stored farthest from the access to the delivery vehicle.

At box 535, an order for conveying the items into the delivery vehicle in series is determined. For example, referring again to the system 400 of FIGS. 4A and 4B, an order may begin with items that are to be stacked at a forward (e.g., an interior) portion of the vehicle 476, which are to be conveyed into the vehicle 476 first, and end with items that are to be stacked at a rear (e.g., nearest an entrance) of the vehicle 476, which may be inserted into the vehicle 476 last.

At box 540, the items are conveyed into the delivery vehicle in accordance with the order, and at box 550, an item is received at a carrier provided at a terminus of the conveyor. For example, referring again to the system 400 of FIG. 4A and FIG. 4B, the item 40 may be received on the carrier 460 at the terminus of the conveyor 442, as is shown in FIG. 4A. At box 555, the carrier is repositioned to a selected position for the received item, and at box 560, the item is expelled from the carrier at the selected position. For example, where the item has been assigned to a given location within the delivery vehicle, the carrier may be repositioned to an orientation proximate to the given location, thereby enabling the carrier to deposit the item at the given location. The position may be selected based on the operational characteristics or constraints of the automated loader, including but not limited to the dimensions or features of the carrier (e.g., a range at which the carrier may receive or expel items).

At box 565, after expelling the item, the carrier is returned to the terminus of the conveyor. For example, referring to the system 100 of FIGS. 1A and 1B, after the carrier 160 has been lifted upwardly and to the right by extending or recoiling one or more of the cables 154A, 154B, 154C, 154D, 154E, 154F, 154G, 154H in concert using the corresponding tensioning actuators 152-1, 152-2, 152-3, 152-4, to expel the item 10, the carrier 160 may be returned to the terminus of the conveyor 142, where the carrier 160 may be configured to receive another item (not shown) by way of the conveyor 142. At box 570, whether any items remain to be loaded is determined. If any such items remain, then the process returns to box 550, where one of the items is received at the carrier at the terminus of the conveyor. If no such items remain, however, then the process ends.

Figure 6A:
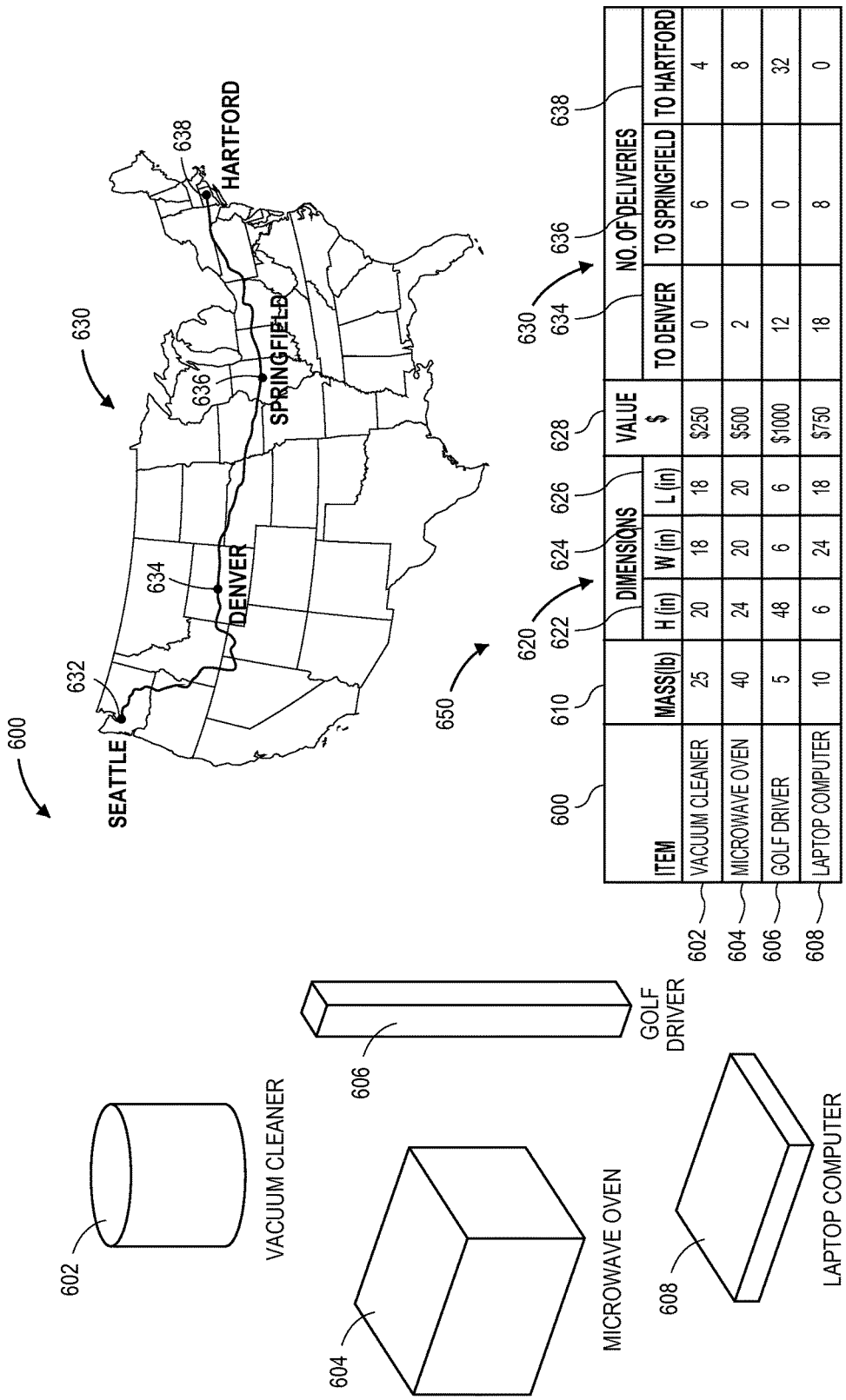
FIG. 6A includes information that may be considered by one embodiment of an automated loading system in accordance with the present disclosure.

Accordingly, the systems and methods of the present disclosure may selectively determine the most preferred locations for the storage of items in a given environment, such as an interior of a delivery vehicle, and may automatically load such items into the given environment using a carrier or like apparatus that is manipulated through the use of one or more cable robots. The preferred locations may be selected on any basis, including but not limited to the dimensions, masses and/or values of the items to be stored, as well as the dimensions of the environment in which the items are to be stored, and a time, date or location at which the items are to be accessed. Referring to FIGS. 6A and 6B, information 600 that may be considered by one embodiment of an automated loading system in accordance with the present disclosure is shown. Except where otherwise noted, reference numerals preceded by the number "6" in FIG. 6A or FIG. 6B indicate components or features that are similar to components or features having reference numerals preceded by the number "4" in FIG. 4A or FIG. 4B, by the number "2" shown in FIG. 2, or by the number "1" shown in FIG. 1A or FIG. 1B.

The information 600 identifies items 602, 604, 606, 608 that are to be loaded onto a delivery vehicle 676, a delivery route 630 to be traveled by the delivery vehicle 676, and a table 650 of attributes of the items 602, 604, 606, 608, which include a vacuum cleaner 602, a microwave oven 604, a golf driver 606 and a laptop computer 608. The delivery route 630 includes an origin 632 (viz., Seattle, Wash.) and destinations 634, 636, 638 (viz., Denver, Colo.; Springfield, Ill.; and Hartford, Conn.).

The table 650 includes masses 610, dimensions 620, values 628 and numbers of the items 602, 604, 606, 608 to be delivered to the respective destinations 634, 636, 638. For example, the vacuum cleaner 602 has a mass of twenty-five pounds (25 lbs.), and is twenty inches (20") high, eighteen inches (18") wide and eighteen inches (18") long, with a value of two hundred fifty dollars ($250). Although none of the vacuum cleaners 602 are to be delivered to Denver 634, six and four of the vacuum cleaners 602, respectively, are to be delivered to Springfield 636 and Hartford 638. Likewise, the microwave oven 604 weighs forty pounds (40 lbs.), and is twenty-four inches (24") high, twenty inches (20") wide and twenty inches (20") long, with a value of five hundred dollars ($500). Two of the microwave ovens 604 are to be delivered to Denver 634, and eight of the microwave ovens 604 are to be delivered to Hartford 638. The golf driver 606 weighs five pounds (5 lbs.) and is forty-eight inches (48") high, six inches (6") wide and six inches (6") long, with a value of one thousand dollars ($1,000), and twelve of the golf drivers 606 are to be delivered to Denver 634, while thirty-two of the golf drivers 606 are to be delivered to Hartford 638. Finally, the laptop computer 608 weighs ten pounds (10 lbs.), and is six inches (6") high, twenty-four inches (24") wide and eighteen inches (18") long, with a value of seven hundred fifty dollars ($750). Eighteen laptop computers 608 are to be delivered to Denver 634, while eight laptop computers 608 are to be delivered to Springfield 636.

As is discussed above, the systems and methods of the present disclosure may be utilized to select locations for the storage of items in an environment, such as within a delivery vehicle, based on attributes of the items, e.g., dimensions, masses, values or intended destinations of the items, or attributes of the environment, e.g., available volumes or space limitations, or a capacity of one or more humans or machines to receive such items, and to deposit the items within the environment using one or more cable robots. Some further attributes of the items include, but are not limited to, times or dates on which the items are expected to depart from the environment or be delivered to a customer.

Referring to FIG. 6B, a delivery vehicle 676 (e.g., a truck) is shown. The vehicle 676 has a volume in the shape of a substantially rectangular hollow for accommodating items, with a height $H_{TRUCK}$, a width $W_{TRUCK}$ and a length $L_{TRUCK}$, and includes a plurality of items 602, 604, 606, 608 stored therein.

As is shown in FIG. 6B, the placement of the items within the delivery vehicle 676 may be determined based on the dimensions and masses of the items, the values of the items, as well as the order in which the delivery vehicle 676 will arrive at each of the destinations 634, 636, 638. For example, the items 602, 604, 606 that are to be delivered to Hartford 638, viz., the final destination on the delivery route 630, are stored in a forward portion of the delivery vehicle 676, farthest from the access. The items 602, 608 that are to be delivered to Springfield 636, viz., the second destination along the delivery route 630, are stored in an intermediate portion of the delivery vehicle 676, with the laptop computers 608, which have a weight of ten pounds (10 lbs.) each, stacked atop some of the vacuum cleaners 602, which have a weight of twenty-five pounds (25 lbs.) each. The items 604, 606, 608 that are to be delivered to Denver 634, viz., the first destination along the delivery route 630, are stored nearest the access to the delivery vehicle 676, with the golf drivers 606, which have a weight of five pounds (5 lbs.) each, stacked atop some of the laptop computers 608. Moreover, as is also shown in FIG. 6B, none of the items having the highest value, viz., the golf drivers 606, are stacked with any other items above or atop them. Similarly, the items having the second-highest values, viz., the laptop computers 608, are placed within the delivery vehicle 676 such that only the golf drivers 606 are provided above or atop them.

Accordingly, the systems and methods of the present disclosure may be utilized to place and store items in any environment, including but not limited to an interior of a delivery vehicle, on any basis and in any manner that facilitates access to the items at their intended destination and minimizes the risk that one or more of the items may be damaged in transit using one or more carriers that are manipulated by cable robots in accordance with the present disclosure. Although the items 602, 604, 606, 608 in the delivery vehicle 676 shown in FIG. 6B are divided into discrete sections within the delivery vehicle 676, those of ordinary skill in the pertinent art will recognize that the systems and methods disclosed herein are not so limited. For example, one or more of the items 602, 608 that are intended for delivery to Springfield 636 may be stacked atop or adjacent to one or more of the items 602, 604, 608 that are intended for delivery to Hartford 638, and one or more of the items 604, 606, 608 that are intended for delivery to Denver 634 may be stacked atop or adjacent to one or more of the items 602, 608 that are intended for delivery to Springfield 636. Likewise, the items 602, 604, 606, 608 stored within the delivery vehicle 676 may be sorted by item. Those of ordinary skill in the pertinent arts will recognize that locations for the placement and storage of the items 602, 604, 606, 608 within the delivery vehicle 676 may be selected on any basis, and the items 602, 604, 606, 608 may be stored therein using one or more carriers manipulated by cable robots, in accordance with the present disclosure.

The systems and methods of the present disclosure may use one or more carriers or platforms that are controlled by cable robots to place items in any fixed or moving location, such as a stationary structural unit or a moving robot. For example, where it is desired to place an item on a fixed surface, a cable robot may receive the item on a carrier at an origin, reposition the carrier to a transfer point adjacent to the fixed surface, transfer the item to the fixed surface, and return to the origin to receive another item. Alternatively, where it is desired to place an item on a moving surface, such as one or more levels of an autonomous mobile robot, the carrier may be repositioned by the cable robot to meet the moving surface at a transfer point, and while moving at a speed or velocity that is synchronized to that of the moving surface, such that the item may be transferred to the moving surface without having to stop the motion of the moving surface.

Figure 7:
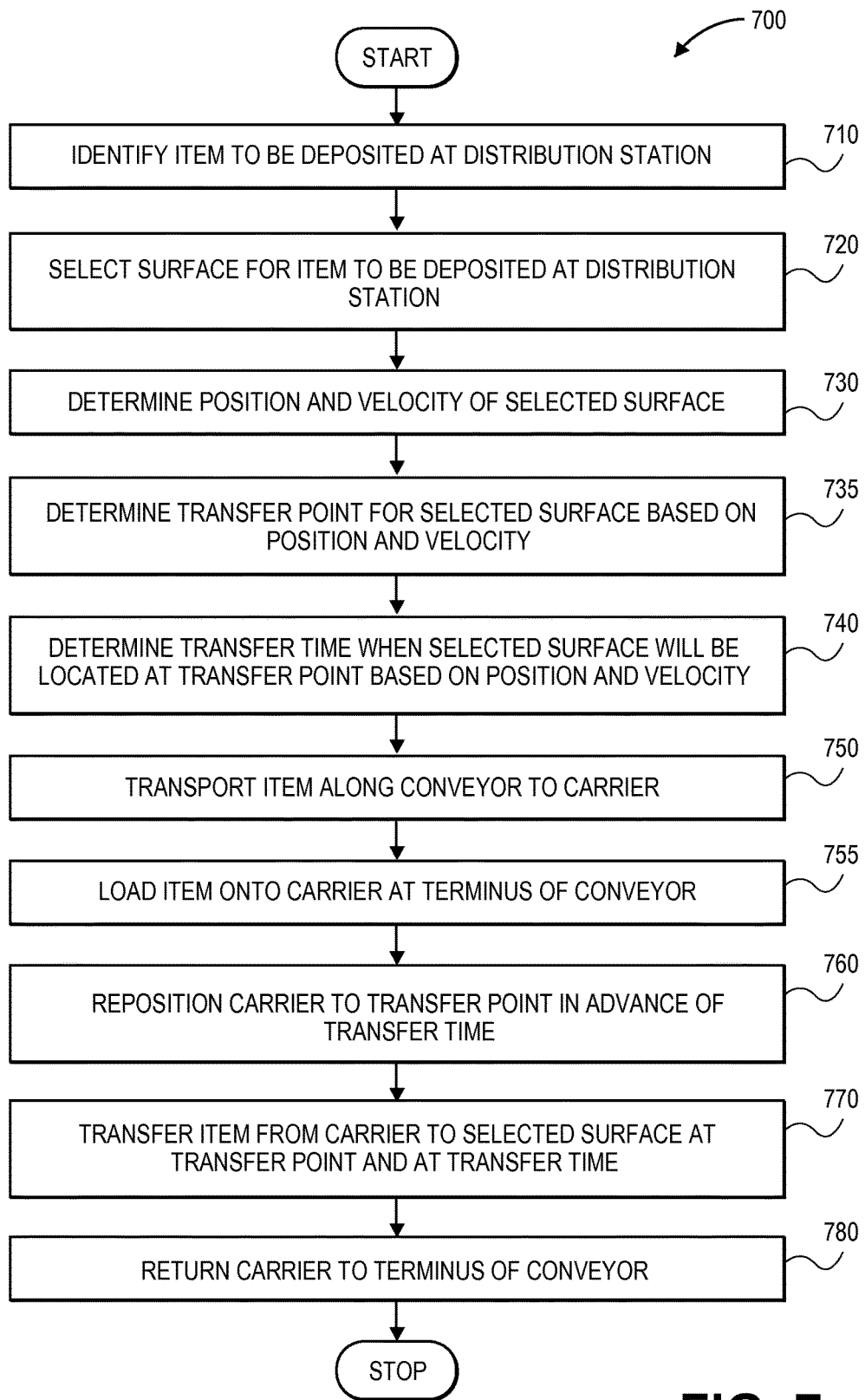
FIG. 7 is a flow chart of one process that may be performed by one embodiment of an automated loading system in accordance with the present disclosure.

Referring to FIG. 7, a flow chart 700 of one process that may be performed by one embodiment of an automated loading system in accordance with the present disclosure is shown. The flow chart 700 begins at box 710, where an item that is to be deposited at a distribution station is identified, before proceeding to box 720, where a surface for depositing the item at the distribution station is selected. For example, it may be desired to place the item on a specific shelf, table or other stationary surface within the distribution station, or onto one or more moving surfaces, e.g., moving carts or autonomous mobile robots, at the distribution station.

At box 730, the position and the velocity of the selected surface is determined. The position of the selected surface may be fixed or moving, with a fixed surface naturally having a velocity of zero. At box 735, a transfer point for the selected surface is determined, and at box 740, a transfer time when the selected surface will be located at the transfer point may be determined based on the position and the velocity of the selected surface. For example, a vector representative of the motion of the selected surface may be generated, and a point within a range of a carrier manipulated by a cable robot may be identified based on the vector.

At box 750, an item is transported along a conveyor to the carrier, and at box 755, the item is loaded onto the carrier at a terminus of the conveyor. For example, referring to the system 100 of FIG. 1A, the item 10 may be received upon the carrier 160 by way of the conveyor 164. At box 760, the carrier is repositioned to the transfer point in advance of the transfer time. For example, referring again to the system 100 of FIG. 1B, the carrier 160 may be lifted by the distance $\Delta y$ and translated by the distance $\Delta x$ into the new position by the corresponding tensioning actuators 152-1, 152-2, 152-3, 152-4.

At box 770, the item is transferred from the carrier to the selected surface. For example, if the selected surface is stationary, e.g., a shelf, a table, a platform or a pallet, then the item may be transferred from the carrier to the selected surface upon its arrival at the transfer point. If the selected surface onto which the item is to be transferred is in motion, however, the carrier may await the arrival of the selected surface at the transfer point. As the selected surface approaches the transfer point, the cable robot may cause the carrier to travel in a parallel path and at a common velocity with the selected surface before transferring the item to the selected surface. At box 780, the carrier is returned to the terminus of the conveyor, where the carrier may be configured to receive another item, and the process ends.

The capacity of some embodiments of the present disclosure to transfer items to selected fixed or moving surfaces may be shown in FIGS. 8A, 8B, 9A, 9B, 10A, 10B, 11A and 11B. Referring to FIGS. 8A, 8B, 9A, 9B, 10A, 10B, 11A and 11B, embodiments of automated loading systems 800, 900, 1000, 1100 in accordance with embodiments of the present disclosure are shown. Except where otherwise noted, reference numerals preceded by the number "11" in FIG. 11A or FIG. 11B, by the number "10" in FIG. 10A or FIG. 10B, by the number "9" in FIG. 9A or FIG. 9B or by the number "8" in FIG. 8A or FIG. 8B indicate components or features that are similar to components or features having reference numerals preceded by the number "6" in FIG. 6A or FIG. 6B, by the number "4" in FIG. 4A or FIG. 4B, by the number "2" shown in FIG. 2, or by the number "1" shown in FIG. 1A or FIG. 1B.

Figure 8A:
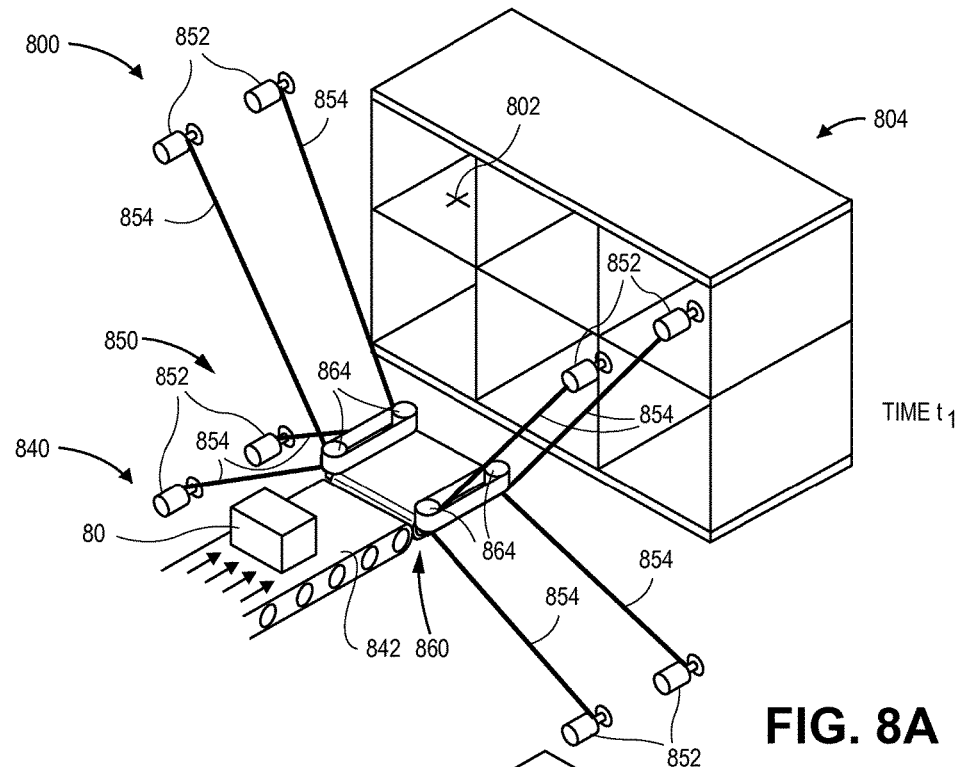
FIGS. 8A and 8B show one embodiment of an automated loading system in accordance with embodiments of the present disclosure.
Figure 8B:
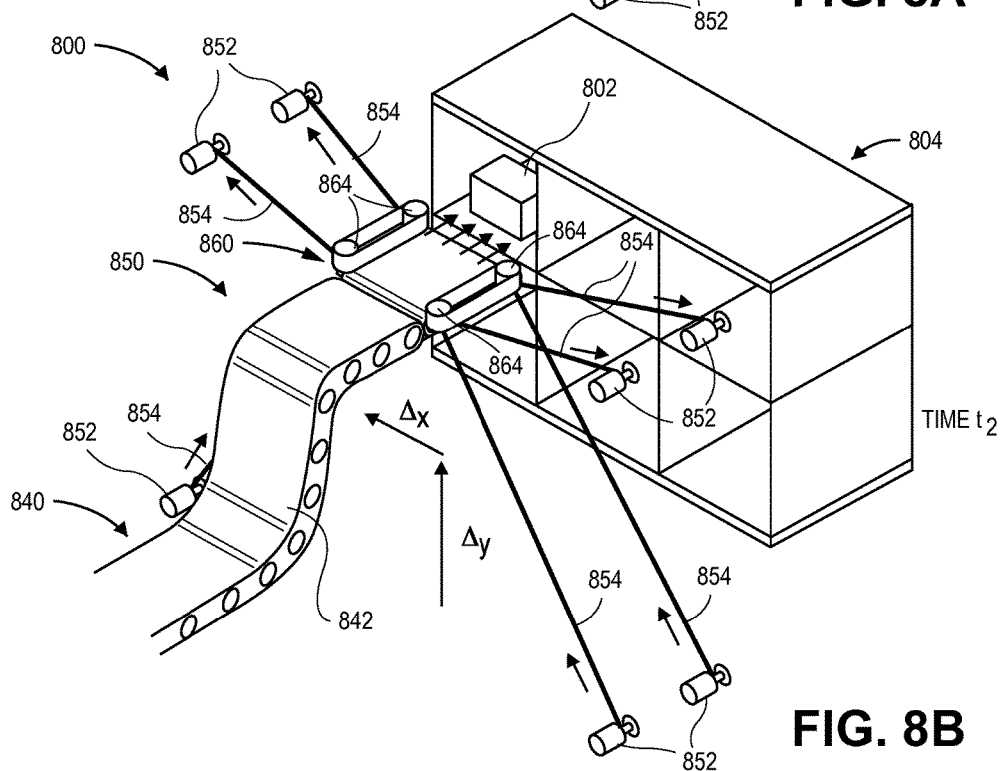

As is discussed above, some of the embodiments of the present disclosure may be directed to receiving one or more items by way of a conveying system, and depositing the item at a fixed location, e.g., one or more shelves, tables or platforms. Referring to FIGS. 8A and 8B, the automated loading system 800 includes an automated loader 840, a cable robot 850 and a carrier 860, as well as a fixed surface 804 (e.g., a shelf, a table or a platform) having a transfer point 802 thereon (e.g., a particular location on the shelf, the table or the platform). As is shown in FIG. 8A, the automated loader 840 includes an articulable conveyor 842 transporting an item 80 toward the carrier 860, which is fixed at a terminus of the articulable conveyor 842. The cable robot 850 includes a plurality of tensioning actuators 852, each of which is joined to the carrier 860 by way of a cable 854 in tension. The carrier 860 includes pairs of induction conveyors 864 that are configured to automatically receive the item 80 thereon at a terminus of the articulable conveyor 842, and to expel the item 80 therefrom as desired.

In accordance with the present disclosure, and as is shown in FIG. 8B, after the item 80 has been loaded onto the carrier 860, e.g., by receiving the item 80 from the articulable conveyor 842 between the induction conveyors 864, the carrier 860 and the articulable conveyor 842 may be repositioned by the cable robot 850 to place the carrier 860 in a vicinity of the transfer point 802 on the fixed surface 804. Once the carrier 860 is sufficiently proximate to the transfer point 802, the item 80 may be transferred onto the fixed surface 804 at the transfer point 802 by way of the induction conveyors 864. Subsequently, other items (not shown) may be transported to the carrier 860 along the articulable conveyor 842, which may be repositioned as required in order to transfer one or more of such other items onto other points (not shown) on the fixed surface 804 after the other items have been received.

Figure 9A:
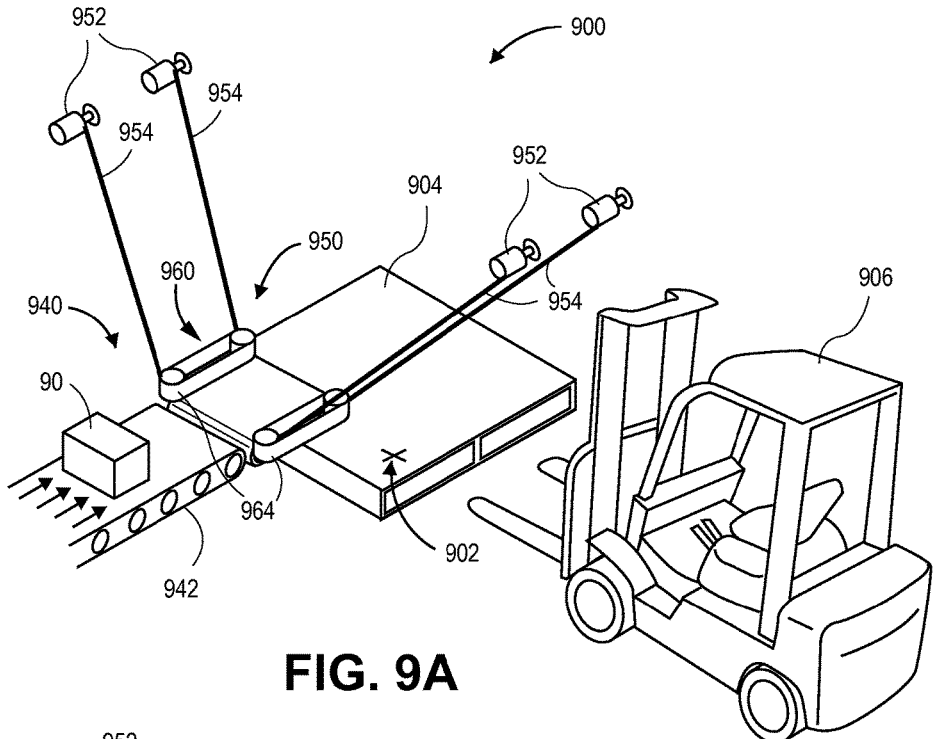
FIGS. 9A and 9B show one embodiment of an automated loading system in accordance with embodiments of the present disclosure.
Figure 9B:
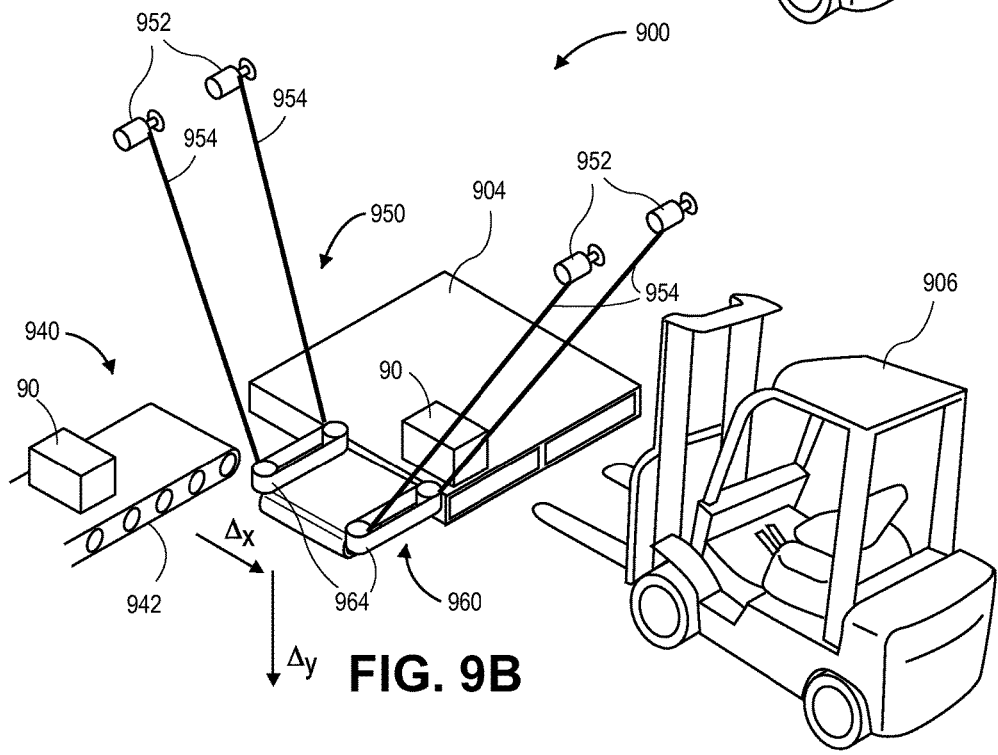

As is also discussed above, some of the embodiments of the present disclosure may be further directed to automatically stacking items upon one or more objects or frames, such as a pallet, in a predetermined or desirable configuration. Referring to FIGS. 9A and 9B, the automated loading system 900 includes an automated loader 940, a cable robot 950 and a carrier 960, as well as a pallet 904 and a forklift 906. As is shown in FIG. 9A, the automated loader 940 includes a conveyor 942 transporting an item 90 toward the carrier 960, which is stationed at a terminus of the conveyor 942. The cable robot 950 includes a plurality of tensioning actuators 952, each of which is joined to the carrier 960 by way of a cable 954 in tension. The carrier 960 includes pairs of induction conveyors 964 that are configured to automatically receive the item 90 thereon at a terminus of the articulable conveyor 942, and to expel the item 90 therefrom as desired. The pallet 904 includes a transfer point 902 thereon (e.g., a particular location on the pallet 904). The forklift 906 is aligned to raise and relocate the pallet 904 and any items thereon.

In accordance with the present disclosure, and as is shown in FIG. 9B, after the item 90 has been loaded onto the carrier 960, e.g., by receiving the item 90 from the conveyor 942 between the induction conveyors 964, the carrier 960 may be repositioned by the cable robot 950 to place the carrier 960 adjacent to the pallet 904. Once the carrier 960 is sufficiently proximate to an edge of the pallet 904, the item 90 may be transferred onto the pallet 904 by way of the induction conveyors 964. Subsequently, other items (not shown) may be transported to the carrier 960 along the conveyor 942 in series, and the carrier 960 may be repositioned, as necessary, to stack the items upon the pallet 904 in one or more appropriate positions. The order in which the items are transported along the conveyor 942 to the carrier 960, and deposited onto the pallet 904, may be determined on any basis, including but not limited to the dimensions or masses of the respective items, the values of the respective items, or an order by which the items are to be retrieved or unloaded from the pallet 904. Once the pallet 904 has been sufficiently loaded, the forklift 906 may transport the pallet 904, the item 90 and any other items to one or more predetermined locations, e.g., from one location within a fulfillment center to another location within the fulfillment center.

Figure 10A:
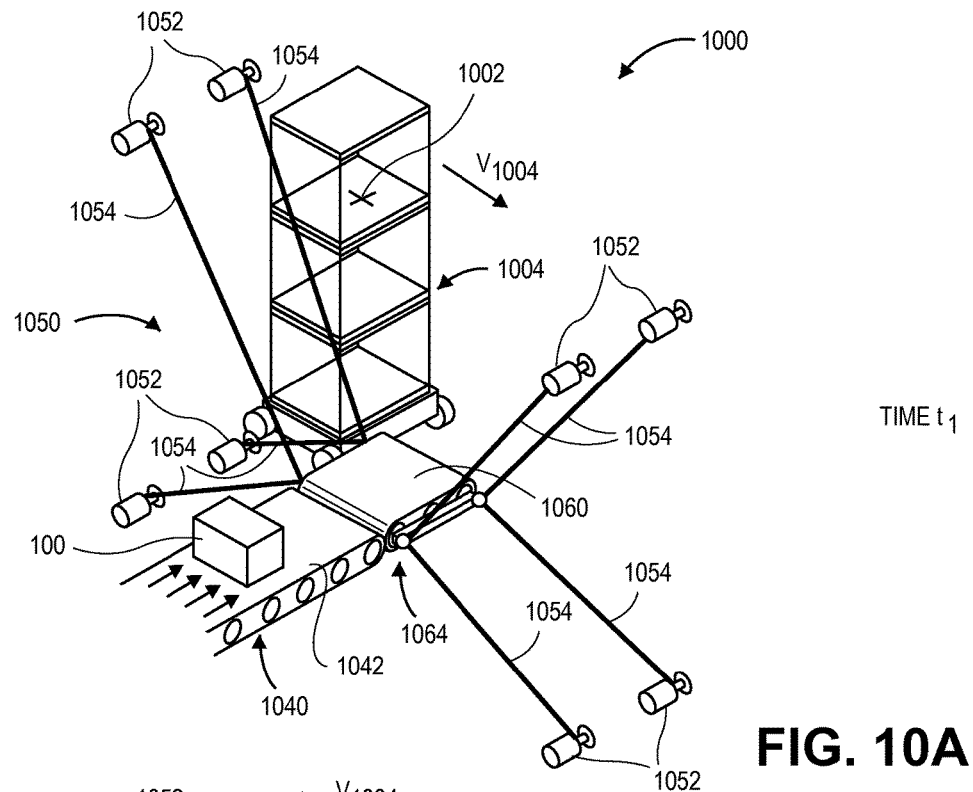
FIGS. 10A and 10B show one embodiment of an automated loading system in accordance with embodiments of the present disclosure.
Figure 10B:
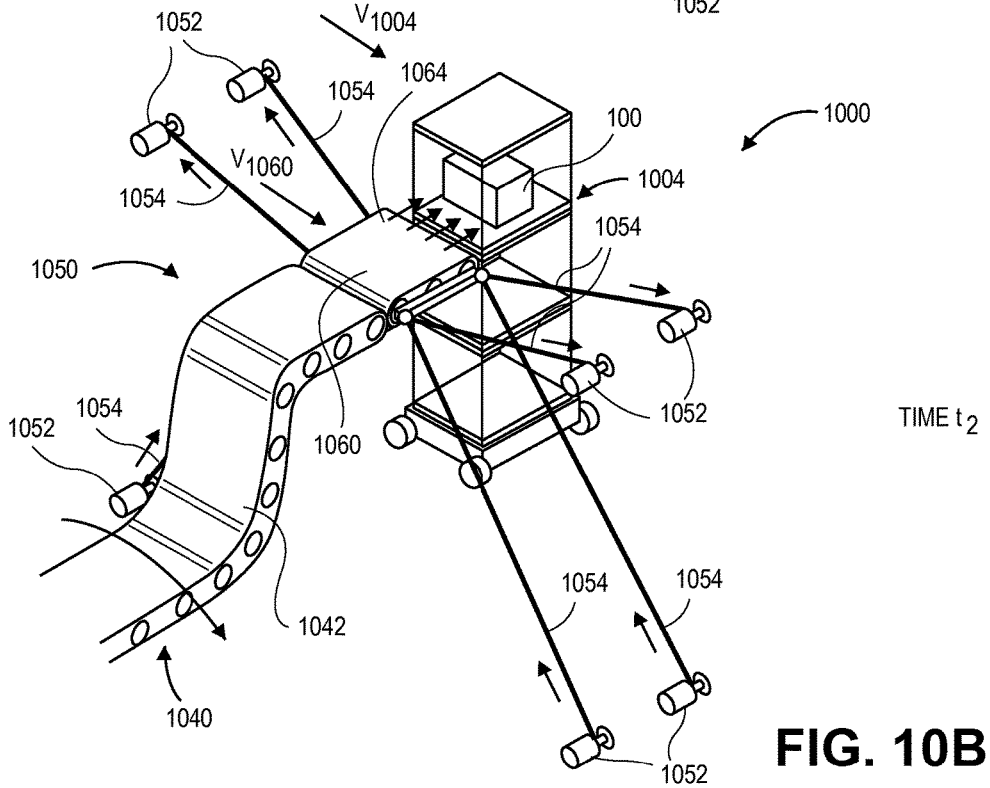

As is further discussed above, some embodiments of the present disclosure may be utilized to load an item onto an autonomous mobile robot, or to receive an item from an autonomous mobile robot, which may be either stationary or in motion. Referring to FIGS. 10A and 10B, the automated loading system 1000 includes an automated loader 1040, a cable robot 1050 and a carrier 1060, as well as a moving surface 1004 (e.g., a platform on a moving autonomous mobile robot) having a transfer point 1002 thereon. The automated loader 1040 includes an articulable conveyor 1042 transporting an item 100 toward the carrier 1060, which is fixed at a terminus of the articulable conveyor 1042. The cable robot 1050 includes a plurality of tensioning actuators 1052, each of which is joined to the carrier 1060 by way of a cable 1054 in tension. The carrier 1060 includes a conveyor 1064 that is configured to automatically receive the item 100 thereon at a terminus of the articulable conveyor 1042, and to expel the item 100 therefrom, as desired.

In accordance with the present disclosure, and as is shown in FIG. 10B, after the item 100 has been loaded onto the carrier 1060, e.g., by receiving the item 100 thereon from the articulable conveyor 1042, the carrier 1060 and the articulable conveyor 1042 may be repositioned by the cable robot 1050 to place the carrier 1060 in a vicinity of the transfer point 1002 on the moving surface 1004. Prior to transferring the item 100, the carrier 1060 may be repositioned to an orientation that is substantially level with the moving surface 104. When the moving surface 1004 is within a sufficient range of the carrier 1060, the carrier 1060 may be caused to travel substantially parallel to the moving surface 1004 and at a substantially equal velocity, e.g., by placing the item 100 in motion on the carrier 1060 at a velocity $V_{1060}$ that is substantially equal to a velocity $V_{1004}$ of the moving surface 1004, thereby enabling the item 100 to be seamlessly transferred from the carrier 1060 to the moving surface 1004 by way of the carrier conveyor 1064, without requiring the moving surface 1004 to be brought to a halt first.

Subsequently, other items (not shown) may be transported to the carrier 1060 along the articulable conveyor 1042, which may be repositioned as required in order to transfer one or more of such other items onto other moving surfaces 1004, e.g., onto surfaces of one or more other autonomous mobile robots (not shown), from the carrier conveyor 1064 after such other items have been received onto the carrier 1060. The articulable conveyor 1042 and the carrier 1060 may be caused to match a speed or velocity and level or elevation of any moving surface 1004, subject to any operational constraints of the cable robot 1050, or any of the tensioning actuators 1052 or cables 1054, in accordance with the present disclosure.

Figure 11A:
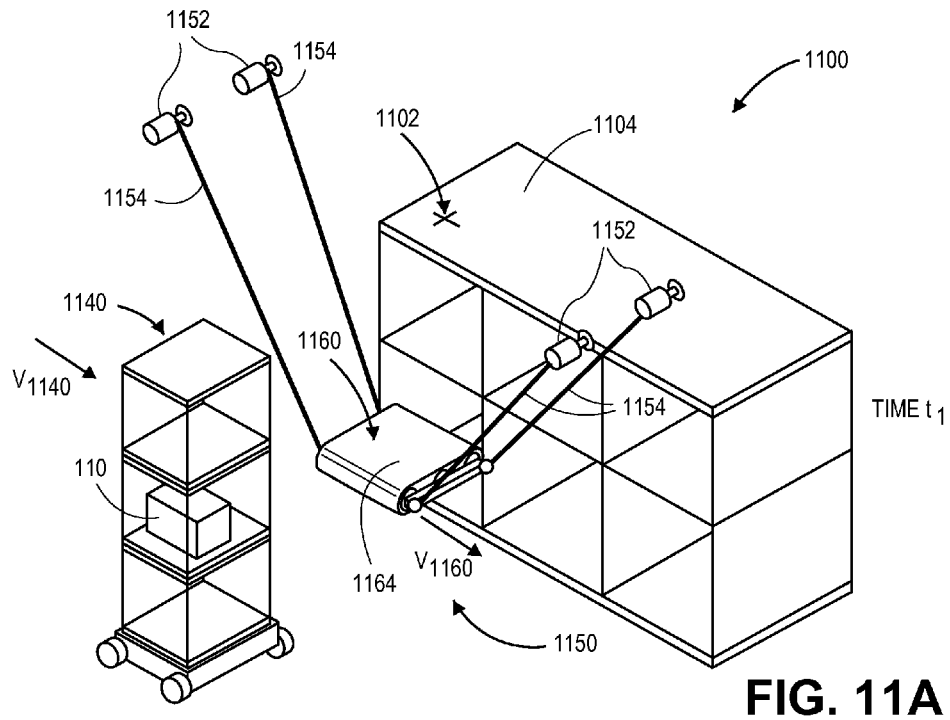
FIGS. 11A and 11B show one embodiment of an automated loading system in accordance with embodiments of the present disclosure.
Figure 11B:
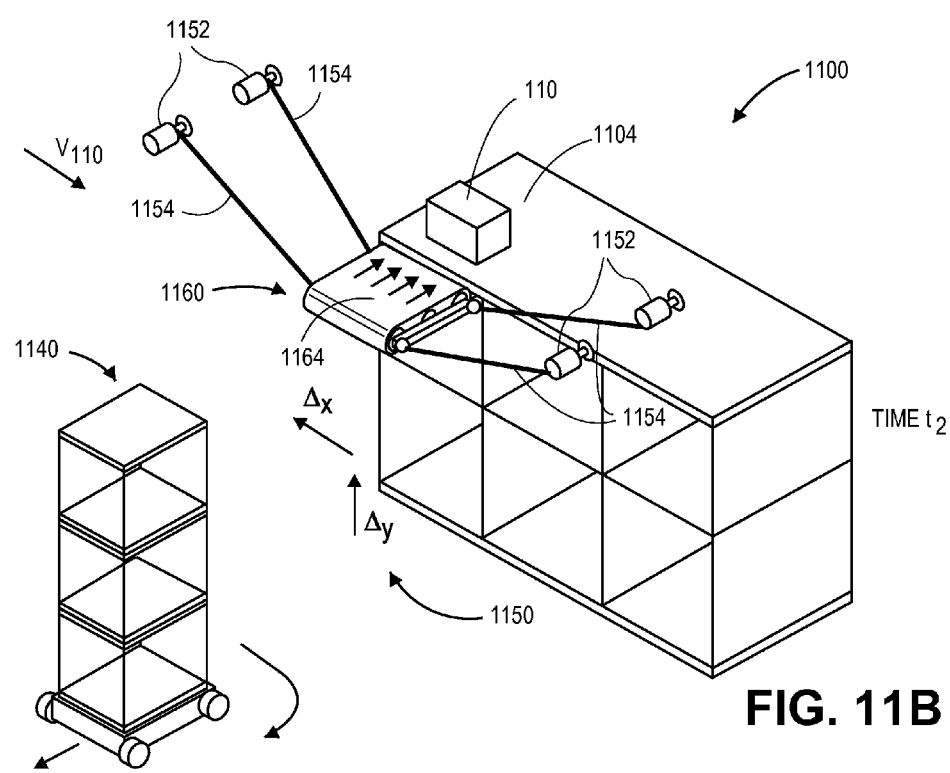

Those of ordinary skill in the pertinent arts will recognize that the systems and methods disclosed herein may also be provided to receive an item from a moving surface onto a carrier at a first location, and to move the item from the first location to a second location using one or more cable robots. Referring to FIGS. 11A and 11B, the automated loading system 1100 includes a moving surface 1140 (e.g., a platform on an autonomous mobile robot), a cable robot 1150 and a carrier 1160, as well as a fixed surface 1104 (e.g., a shelf, a table or a platform) having a transfer point 1102 thereon (e.g., a particular location on the shelf, the table or the platform). The moving surface 1140 carries an item 110 thereon toward the carrier 1160, which is joined in tension to a cable robot 1150 including a plurality of tensioning actuators 1152, each of which is joined to the carrier 1160 by way of a cable 1154 in tension. The carrier 1160 further includes a conveyor 1164 that is configured to automatically receive the item 110 thereon, and to expel the item 110 therefrom, as desired.

In accordance with the present disclosure, as is shown in FIG. 11A, the moving surface 1140 approaches the carrier 1160 at a velocity $V_{1140}$. When the moving surface 1140 is within a sufficient range of the carrier 1160, the carrier 1160 may be caused to travel substantially parallel to the moving surface 1140 and at a substantially equal velocity, e.g., by placing the carrier 1160 in motion at a velocity $V_{1160}$ that is substantially equal to a velocity $V_{1140}$ of the moving surface 1140, thereby enabling the item 110 to be seamlessly transferred from the moving surface 1140 to the carrier 1160 by way of the carrier conveyor 1164, without requiring the moving surface 1140 to be brought to a halt first. Subsequently, as is shown in FIG. 11B, the carrier 1160 may be repositioned to an orientation that is within a vicinity of the transfer point 1102 of the fixed surface 1104, thereby enabling the item 110 to be expelled from the carrier 1160 onto the fixed surface 1104, as desired, and the moving surface 1140 may be repositioned to another location for any relevant purpose. For example, an autonomous mobile robot having the moving surface 1140 thereon may be relocated in order to receive one or more additional items (not shown) thereon, and may return to the automated loading system 1100 in order to transfer such other items to the carrier 1160, without having to come to a halt first.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the movement and placement of items at a loading dock, the systems and methods disclosed herein are not limited to loading dock operations. Rather, one or more of the automated loading systems or system components disclosed herein may be provided in any environment in which the loading, lifting, transporting and depositing of items in a given location are desired. For example, the systems and methods disclosed herein may be used in one or more inbound processes, e.g., in which items are received at a fulfillment center in one or more inbound shipments from vendors, manufacturers, sellers, or other fulfillment centers, as well as when preparing items for storage or delivery.

Moreover, the systems and methods of the present disclosure are not limited to the use of cable robots. In addition to cable robots, or as a complement to cable robots, one or more other robotic systems may be used to raise, lower, translate, receive or deposit items in accordance with the present disclosure. Furthermore, the systems and methods disclosed herein may be utilized to deliver items to multiple locations, e.g., by loading two or more items onto a carrier and expelling such items individually at different locations, and need not necessarily return to an origin or a terminus of a conveyor after unloading each of the items. Similarly, the carriers or other features of the present disclosure may receive an item thereon in any manner, and need not be utilized exclusively with one or more conveyors.

Additionally, those of ordinary skill in the pertinent art will recognize that the systems and methods disclosed herein may also be utilized to unload items from a given location or environment, e.g., within a receiving station or from an arriving inbound delivery vehicle, and are not limited for use in the loading of items into any of the locations or environments disclosed herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   receiving a first item onto a first surface of a carrier in a first position by at least one pair of rotatable induction devices, wherein the carrier is mounted in tension to a cable robot by at least one cable, and wherein the at least one pair of the rotatable induction devices is configured to receive at least the first item therebetween and to expel at least the first item therefrom;
   moving the carrier from the first position to a second position by the cable robot; and
   expelling, with the carrier in the second position, the first item from the carrier by the at least one pair of rotatable induction devices onto at least a second surface.

2. The method of claim 1, wherein the cable robot comprises a plurality of tensioning actuators joined to the carrier by the at least one cable, and
   wherein moving the carrier from the first position to the second position by the cable robot further comprises:

determining, by at least one computer processor, at least one of a first vertical component of the first position or a first lateral component of the first position;

determining, by the at least one computer processor, at least one of a second vertical coordinate of the second position or a second lateral component of the second position;

operating, by the at least one computer processor, at least one of the plurality of tensioning actuators to at least one of:

move the carrier from the first vertical component of the first position to the second vertical component of the second position; or move the carrier from the first lateral component of the first position to the second lateral component of the second position.

3. The method of claim 2, wherein operating the at least one of the plurality of tensioning actuators further comprises extending or retracting the at least one cable.

4. The method of claim 1, wherein the first item is received onto the carrier from at least one of:

a first conveyor configured to transfer at least the first item onto the carrier, wherein the carrier is fixed to a terminus of the first conveyor; or an autonomous mobile robot configured to transfer at least the first item onto the carrier.

5. The method of claim 1, wherein the carrier is in motion during at least one of the receiving the first item onto the carrier in the first position or the expelling the first item from the carrier in the second position.

6. The method of claim 1, wherein the carrier is fixed to a terminus of a first conveyor, and wherein the method further comprises:

after the first item is expelled from the carrier, moving the carrier from the second position to a third position by the cable robot.

7. The method of claim 1, further comprising:

determining, by at least one computer processor, at least one attribute of the first item; and selecting, by the at least one computer processor, at least one of the second surface or the second position of the carrier based at least in part on the at least one attribute of the first item.

8. The method of claim 7, wherein the at least one attribute of the first item is at least one of:

a height of the first item;
a length of the first item;
a depth of the first item;
an area of at least one face of the first item;
a volume of the first item;
a mass of the first item;
a level of delicateness associated with the first item;
a level of hazard associated with the first item;
a designation by a customer;
a designation by a vendor;
an intended arrival time for the first item; or
an intended destination for the first item.

9. The method of claim 7, further comprising:

determining, by the at least one computer processor, at least one attribute of an environment in which the second surface is provided, wherein the at least one of the second surface or the second position is selected based at least in part on the at least one attribute of the environment.

10. The method of claim 9, wherein the at least one attribute of the environment is at least one of:

a dimension of the second surface;
a mass of a second item on which the second surface is provided;
a velocity of the second surface; or
a receiving capacity associated with the environment; or
at least one destination associated with the environment, wherein the environment comprises an interior of a delivery vehicle.

11. The method of claim 1, further comprising:

identifying a plurality of items to be loaded into an interior of a delivery vehicle;

determining, for each of the plurality of items, at least one surface within the interior of the delivery vehicle onto which each of the plurality of items is to be deposited;

establishing an order for transporting the plurality of items in series along a first conveyor based at least in part on the determined surfaces, wherein the order begins with at least the first item, and wherein a first determined surface for at least the first item is the second surface; and transporting at least the first item toward the carrier on the first conveyor.

12. The method of claim 11, further comprising:

determining a first time at which the first item is to be loaded into the interior of the delivery vehicle; and determining a second time at which the first item must be transported toward the carrier on the first conveyor in order to arrive at the carrier by the first time, wherein the order is established based at least in part on the second time.

13. The method of claim 11, further comprising:

moving the carrier from the second position to the first position by the cable robot;

transporting a second item toward the carrier on the first conveyor; and receiving the second item onto the carrier in the first position.

14. The method of claim 11, wherein establishing the order comprises:

determining, for each of the plurality of items, a delivery destination; and selecting, for each of the plurality of items, the at least one surface within the interior of the delivery vehicle based at least in part on the delivery destination.

15. The method of claim 1, wherein the cable robot is coupled to a frame, wherein at least a portion of the frame is configured to be removably inserted within a delivery vehicle, and wherein the method further comprises:

after expelling the first item from the first carrier onto at least the second surface, causing at least the portion of the frame to be withdrawn from the delivery vehicle by a predetermined extent.

16. The method of claim 1, wherein the second surface is one of:

an interior surface within a delivery vehicle;
an outer surface of a second item;
a surface of a fixed storage unit; or
a surface of an autonomous mobile robot.

* * * * *